(12) United States Patent
Ban

(10) Patent No.: US 11,954,375 B2
(45) Date of Patent: *Apr. 9, 2024

(54) NON-TRANSITORY COMPUTER-READABLE RECORDING MEDIUM STORING COMPUTER-READABLE INSTRUCTIONS FOR TERMINAL DEVICE, TERMINAL DEVICE, AND METHOD EXECUTED BY TERMINAL DEVICE

(71) Applicant: BROTHER KOGYO KABUSHIKI KAISHA, Nagoya (JP)

(72) Inventor: Ryoji Ban, Ama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,143

(22) Filed: Dec. 28, 2022

(65) Prior Publication Data
US 2023/0205464 A1 Jun. 29, 2023

(30) Foreign Application Priority Data
Dec. 28, 2021 (JP) ................. 2021-214858

(51) Int. Cl.
*G06F 3/12* (2006.01)
(52) U.S. Cl.
CPC .......... *G06F 3/1204* (2013.01); *G06F 3/1243* (2013.01); *G06F 3/1292* (2013.01)
(58) Field of Classification Search
USPC ........................................................ 358/1.6
See application file for complete search history.

(56) References Cited

U.S. PATENT DOCUMENTS

| 7,185,066 B2 * | 2/2007 | Noble ................. H04L 67/1095 707/999.009 |
| 7,287,001 B1 | 10/2007 | Falls et al. |
| 7,689,625 B2 * | 3/2010 | Westerinen ........... G06F 16/835 707/778 |

(Continued)

FOREIGN PATENT DOCUMENTS

| JP | 2006268388 A | 10/2006 |
| JP | 2007128325 A | 5/2007 |

OTHER PUBLICATIONS

Official Action dated Jul. 27, 2023 in a related application, namely, U.S. Appl. No. 17/935,107 filed Sep. 25, 2022.

*Primary Examiner* — Negussie Worku
(74) *Attorney, Agent, or Firm* — Scully, Scott, Murphy & Presser, PC

(57) ABSTRACT

The terminal device may acquire a first data association instruction for associating a label file and a first database file and acquire a second data association instruction for associating the label file and a second database. The terminal device may, in a case where the first data association instruction and the second data association instruction are acquired, store data association information in a memory. The terminal device may, in a case where a print instruction is acquired under a state where the data association information is stored in the memory, create one or more pieces of print data corresponding to one or more label images using the label file and the third database file associated with the label file, and send the one or more pieces of print data to a label printer.

10 Claims, 11 Drawing Sheets

(56) References Cited

U.S. PATENT DOCUMENTS

| | | | |
|---|---|---|---|
| 7,949,945 B2* | 5/2011 | Dreyer | G06F 40/186 |
| | | | 715/234 |
| 8,356,251 B2* | 1/2013 | Strober | H04L 65/60 |
| | | | 715/740 |
| 8,393,540 B2 | 3/2013 | Alleshouse | |
| 8,507,496 B2* | 8/2013 | Bar-Or | A61K 31/496 |
| | | | 514/252.12 |
| 9,727,700 B2 | 8/2017 | Roberts et al. | |
| 11,170,276 B2* | 11/2021 | Shinagawa | G06K 15/1894 |
| 2005/0137937 A1* | 6/2005 | Njo | G06Q 30/0601 |
| | | | 705/26.1 |
| 2007/0174151 A1 | 7/2007 | Anderson et al. | |
| 2015/0326751 A1* | 11/2015 | Ando | H04N 1/32117 |
| | | | 358/1.14 |
| 2016/0052659 A1* | 2/2016 | Bowers | B65C 1/021 |
| | | | 156/64 |
| 2016/0352932 A1* | 12/2016 | Asai | H04N 1/00347 |
| 2019/0182404 A1* | 6/2019 | Sato | H04N 1/32539 |
| 2020/0104086 A1* | 4/2020 | Asai | G06F 3/1236 |
| 2022/0317942 A1* | 10/2022 | Nagao | G06F 3/1236 |
| 2023/0094288 A1* | 3/2023 | Ban | G06K 15/1802 |
| | | | 358/1.18 |
| 2023/0094562 A1* | 3/2023 | Ban | G06F 40/279 |
| | | | 707/736 |

* cited by examiner

FIG. 2
(Case A)
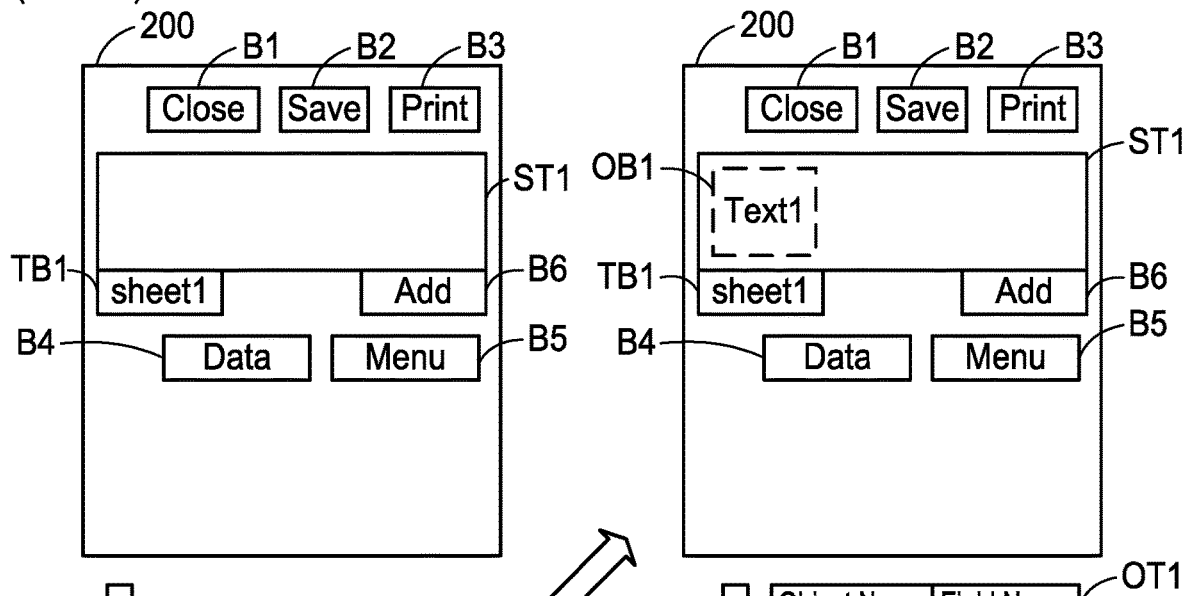
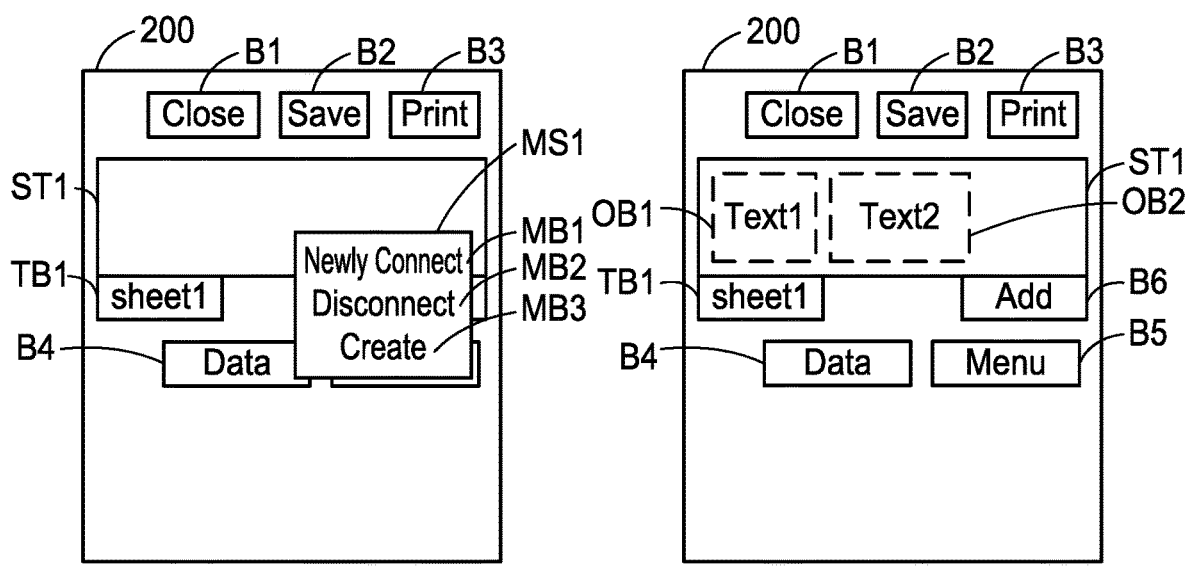

FIG. 4
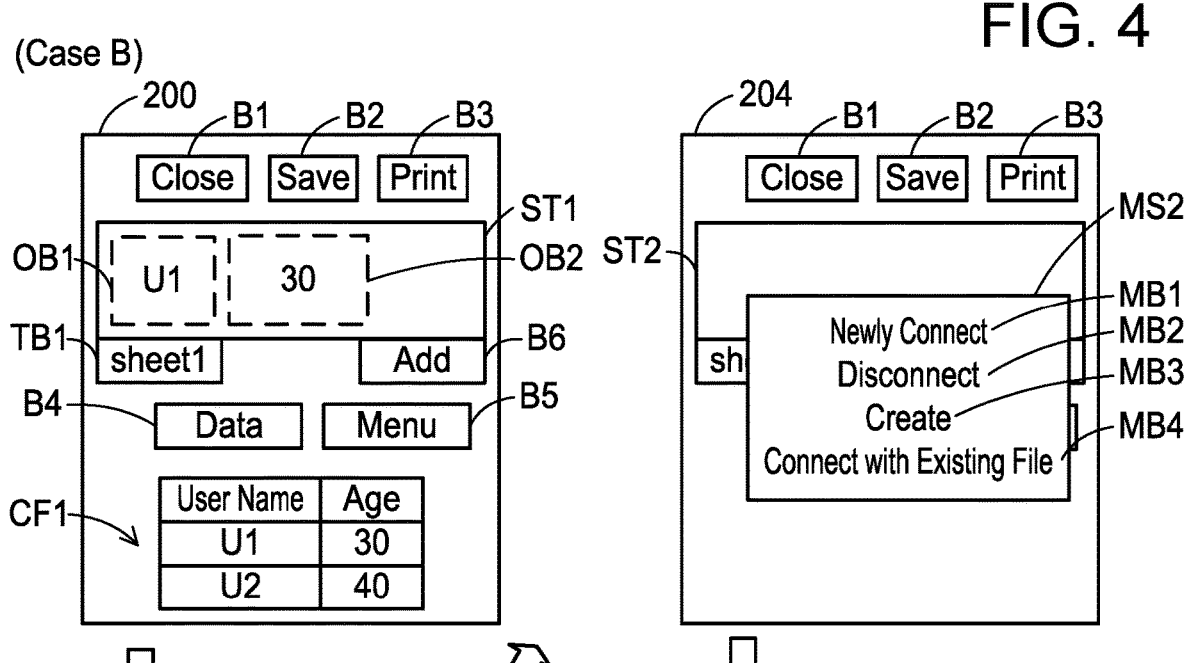
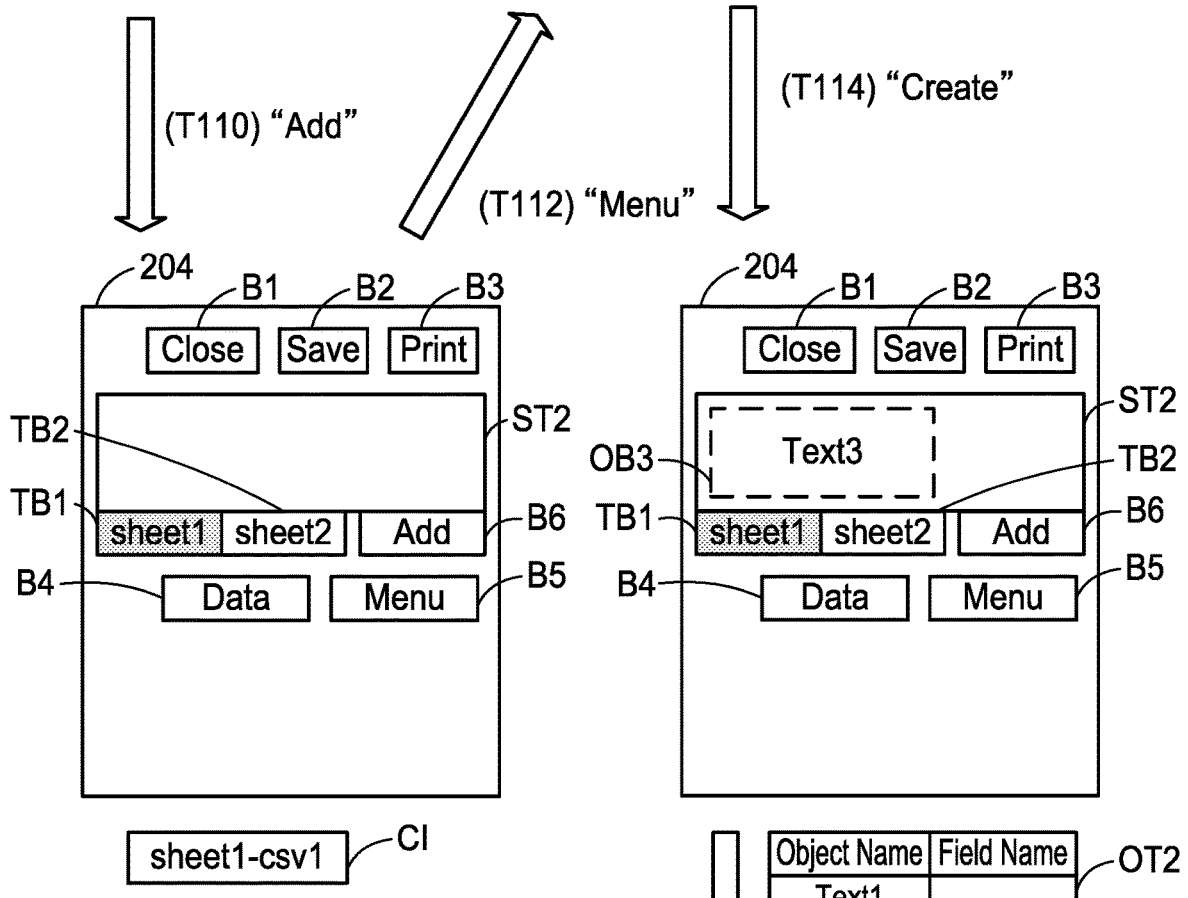
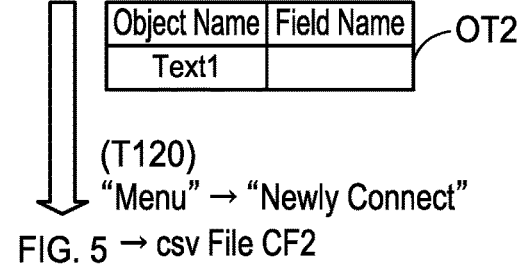

FIG. 8
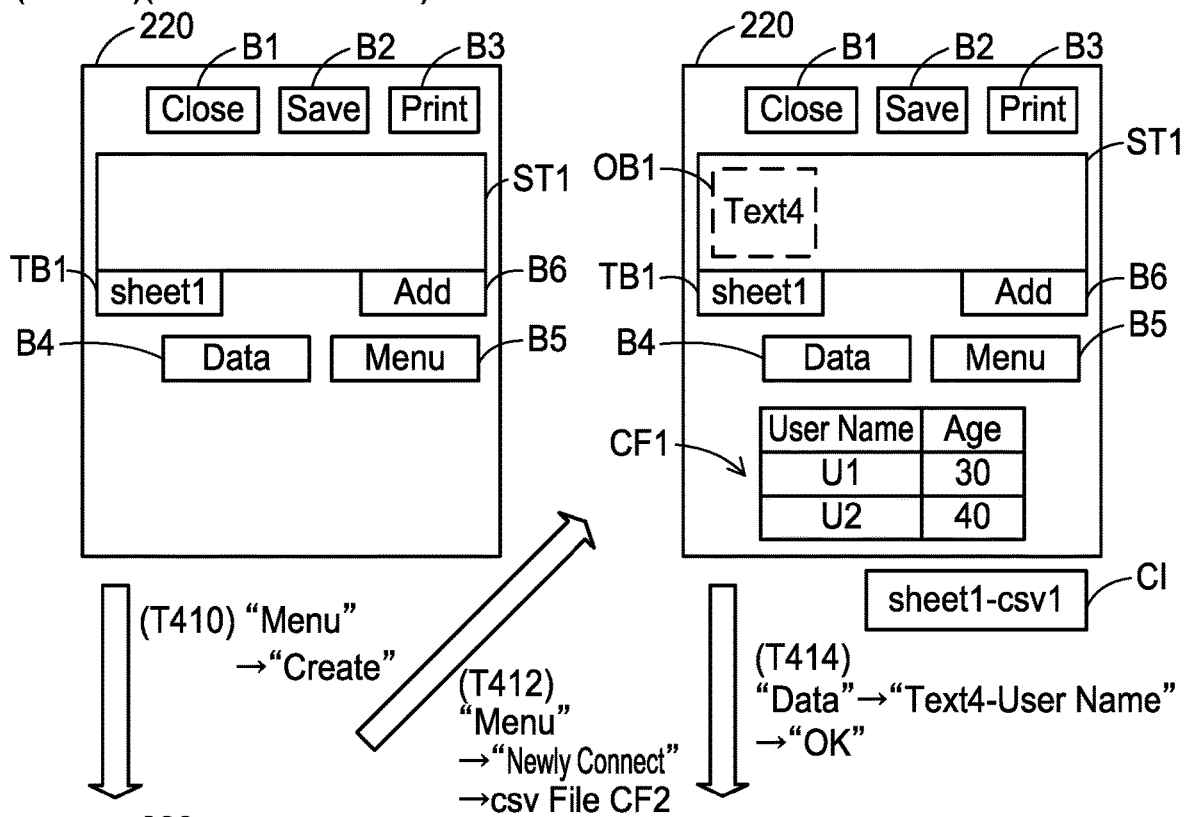
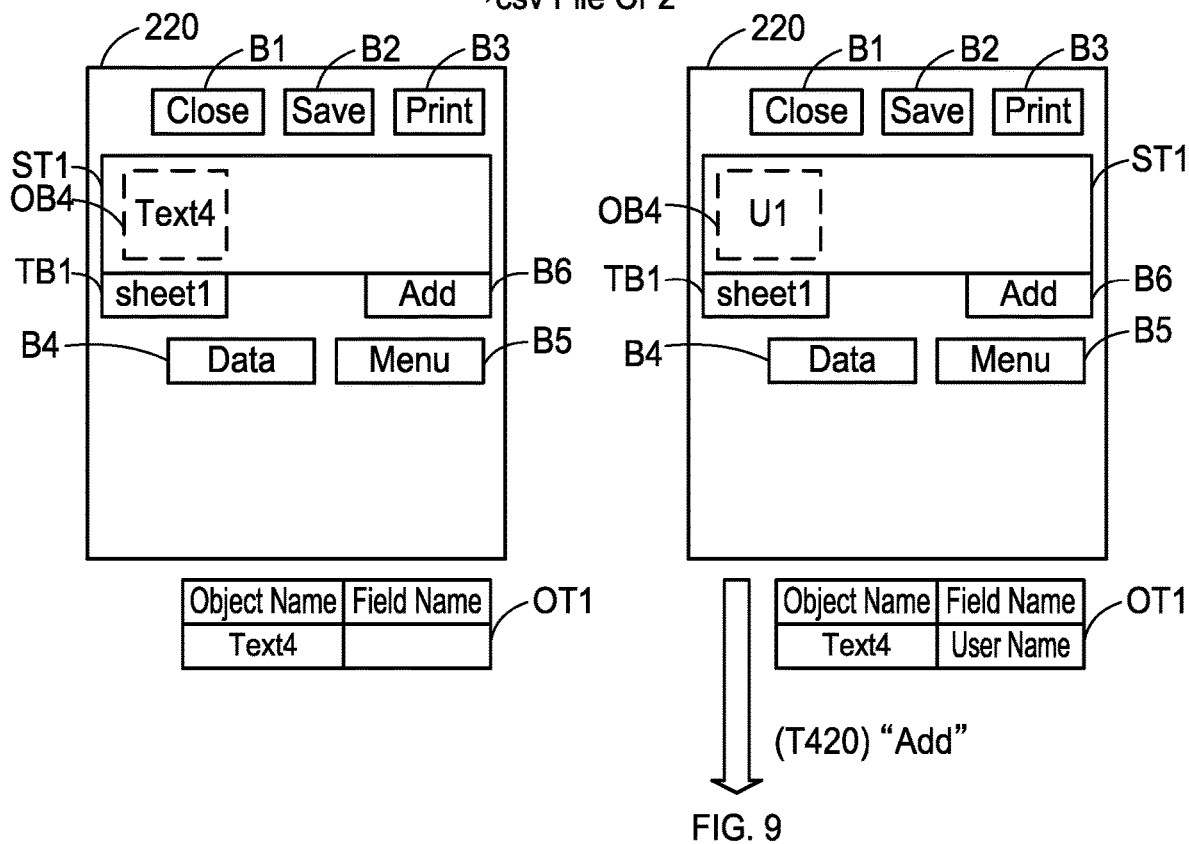

NON-TRANSITORY COMPUTER-READABLE RECORDING MEDIUM STORING COMPUTER-READABLE INSTRUCTIONS FOR TERMINAL DEVICE, TERMINAL DEVICE, AND METHOD EXECUTED BY TERMINAL DEVICE

REFERENCE TO RELATED APPLICATIONS

This application claims priority from Japanese Patent Application No. 2021-214858 filed on Dec. 28, 2021. The entire content of the priority application is incorporated herein by reference.

BACKGROUND ART

A system including a printing device and a personal computer is known. The personal computer stores an object within a working area and a field name within a database in association with each other in a state where the personal computer is connected to the database. In this state, when the personal computer acquires an instruction for print execution, the personal computer executes printing of a label having the object in which a text corresponding to the field name within the database is disposed.

DESCRIPTION

The present teachings provide an art configured to improve user convenience.

The disclosure discloses a non-transitory computer-readable recording medium storing computer-readable instructions for a terminal device. The terminal device may comprise: a processor; and a memory, wherein the computer-readable instructions, when executed by the processor, may cause the terminal device to: acquire a first data association instruction for associating a label file and a first database file, the label file being a template for creating print data representing a label image, and the first database file including M1 (M1 being an integer of 1 or more) texts; acquire a second data association instruction for associating the label file and a second database file different from the first database file, the second database file including M2 (M2 being an integer of 1 or more) texts; in a case where the first data association instruction and the second data association instruction are acquired, store data association information which indicates an association between the label file and a third database file in the memory, the third database file including the M1 texts included in the first database file and the M2 texts included in the second database file; in a case where a print instruction for instructing printing using the label file is acquired under a state where the data association information is stored in the memory, create one or more pieces of print data corresponding to one or more label images using the label file and the third database file associated with the label file, each of the one or more label images including one or more texts among the M1 and the M2 texts included in the third database file; and send the one or more pieces of print data to a label printer.

According to the above configuration, when the first data association instruction and the second data association instruction are acquired, the terminal device causes the memory of the terminal device to store the data association information indicating an association between the label file and the third database file. The third database file includes the M1 texts included in the first database file and the M2 texts included in the second database file. Accordingly, the user can cause the label printer to perform printing of each label image including the respective texts included in the first and second database files, by using the label file and the third database file. Due to this, user convenience can be improved.

A non-transitory computer-readable medium storing computer-readable instructions for implementing the terminal device above, a terminal device realized by the non-transitory computer-readable medium, and a method implemented by the terminal device are also novel and useful. Further, a communication system comprising the terminal device and the label printer is also novel and useful.

FIG. 2 illustrates a sequence diagram of Case A in which a label image indicated in a first image sheet is printed.

FIG. 4 illustrates a sequence diagram of Case B in which a label image indicated in a second image sheet is printed in the first embodiment.

FIG. 8 illustrates a sequence diagram of Case E in which a label image indicated in a color preview image sheet is printed in a third embodiment.

Figure 1:
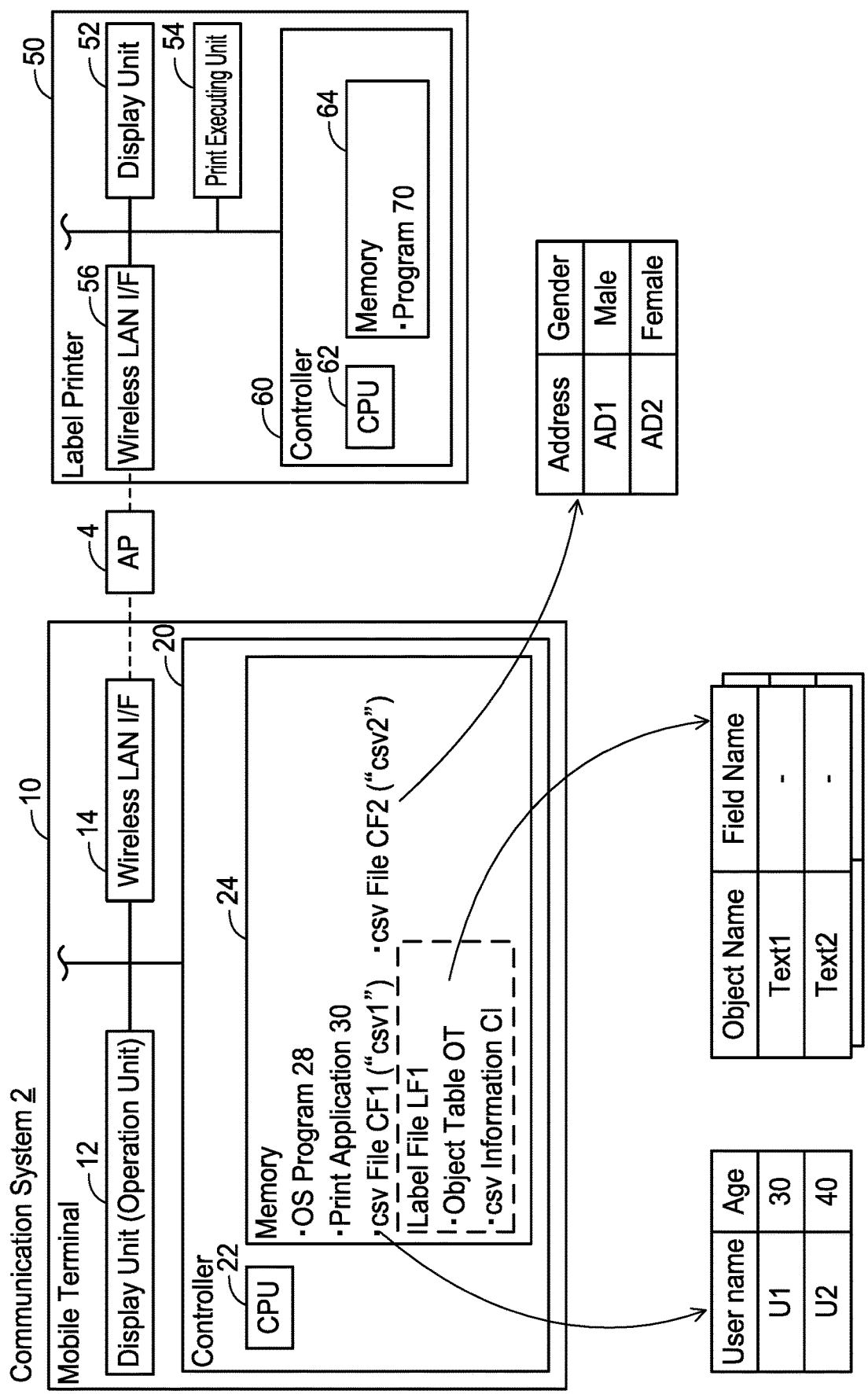
FIG. 1 illustrates a configuration of a communication system.

FIRST EMBODIMENT (Configuration of Communication System 2: FIG. 1)

As shown in FIG. 1, a communication system 2 comprises a mobile terminal 10 and a label printer 50. The mobile terminal 10 and the label printer 50 have a wireless connection established with an access point (AP) 4. The mobile terminal 10 and the label printer 50 are configured to communicate with each other via the AP 4.

The present embodiment realizes a situation in which a user creates a label attachable to an object to be managed by using the mobile terminal 10 and the label printer 50. The label is created by the label printer 50 printing a label image on an adhesive tape. The mobile terminal 10 creates print data corresponding to a label image, and sends the created print data to the label printer 50.

(Configuration of Mobile Terminal 10)

The mobile terminal 10 is a mobile terminal device such as a mobile phone, a smartphone, a PDA, a laptop PC, a tablet PC, a mobile music player, and a mobile video player. The mobile terminal 10 comprises a display unit 12, a wireless LAN interface (hereafter, interface will be referred to as "I/F") 14, and a controller 20.

The display unit 12 is a display for displaying various information. The display unit 12 functions also as a so-called touch pad. Thus, the user can input various kinds of instructions to the mobile terminal 10 by operating a plurality of keys displayed on the display unit 12. That is, the display unit 12 functions as an operation unit also.

The wireless LAN I/F 14 is a I/F configured to execute Wi-Fi communication in accordance with Wi-Fi scheme, and has wireless connection established with the AP 4. The Wi-Fi scheme is for example a wireless communication scheme of 802.11 standards by the Institute of Electrical and Electronics Engineers, Inc. (IEEE) and its subordinate standards (e.g., 802.11a, 11b, 11g, 11n, 11ac).

The controller 20 comprises a CPU 22 and a memory 24. The memory 24 may be constituted of a volatile memory, and/or a non-volatile memory, for example. The CPU 22 is configured to execute various processes in accordance with an operating system (OS) program 28, a print application 30 that are stored in the memory 24. The OS program 28 is a program for controlling various kinds of basic operations of the mobile terminal 10. The print application 30 is an application provided by a vendor of the label printer 50, and is installed on the mobile terminal 10 from a server on the Internet. The print application 30 is an application for causing the label printer 50 to print a label or the like by using the mobile terminal 10. Hereafter, the application may be referred to as "app".

The memory 24 further stores csv files CF1, CF2. The csv files are each a text file in which plural texts are set off by comma(s). FIG. 1 illustrates plural texts written in the csv files CF1 and CF2 respectively in table format. In a first row of each of the csv files CF1, CF2 (that is, uppermost row), field names are written. In the csv file CF1, texts corresponding to the field name "User Name" and texts corresponding to the field name "Age" are respectively aligned along a column direction (vertical direction). The csv file CF1 includes four texts "U1", "U2", "30", "40". In the csv file CF2, texts corresponding to the field name "Address" and texts corresponding to the field name "Gender" are respectively aligned along the column direction. The csv file CF2 includes four texts "AD1", "AD2", "Male", "Female".

The memory 24 may further store a label file LF1 which is a template for creating print data representing a label image. In the label file LF1, plural object tables OT and csv information CI may be written. In the object tables OT, object names and field names are associated with each other. The object names are each information for identifying an object area which will be described later. The csv information CI is information indicating a csv file associated with the label file LF1.

(Configuration of Label Printer 50)

The label printer 50 comprises a display unit 52, a print executing unit 54, a wireless LAN I/F 56, and a controller 60.

The display unit 52 is a display for displaying various kinds of information. The print executing unit 54 is of a so-called thermal transfer printing mechanism, and configured to create a label by copying a label image on a label tape. In the print executing unit 54, one label tape is detachably mounted. In a modification, the print executing unit 54 may be of another printing mechanism such as an ink-jet scheme, a laser scheme. The wireless LAN I/F 56 is similar to the wireless LAN I/F 14 mentioned above.

The controller 60 comprises a CPU 62 and a memory 64. The CPU 62 is configured to execute various processes in accordance with the program 70 stored in the memory 64. The memory 64 may be composed of a non-volatile memory, a volatile memory, or the like.

(Specific Cases; FIG. 2 to FIG. 6)

With reference to FIGS. 2 to 6, specific cases A, B implemented by the communication system 2 of the present embodiment will be described. Hereinbelow, for easier understanding, operations which the CPUs 22, 62 of the respective devices 10, 50 execute will be described with the respective devices (i.e., the mobile terminal 10, the label printer 50) as a subject of action instead of describing the CPU as the subject of action.

Figure 3:
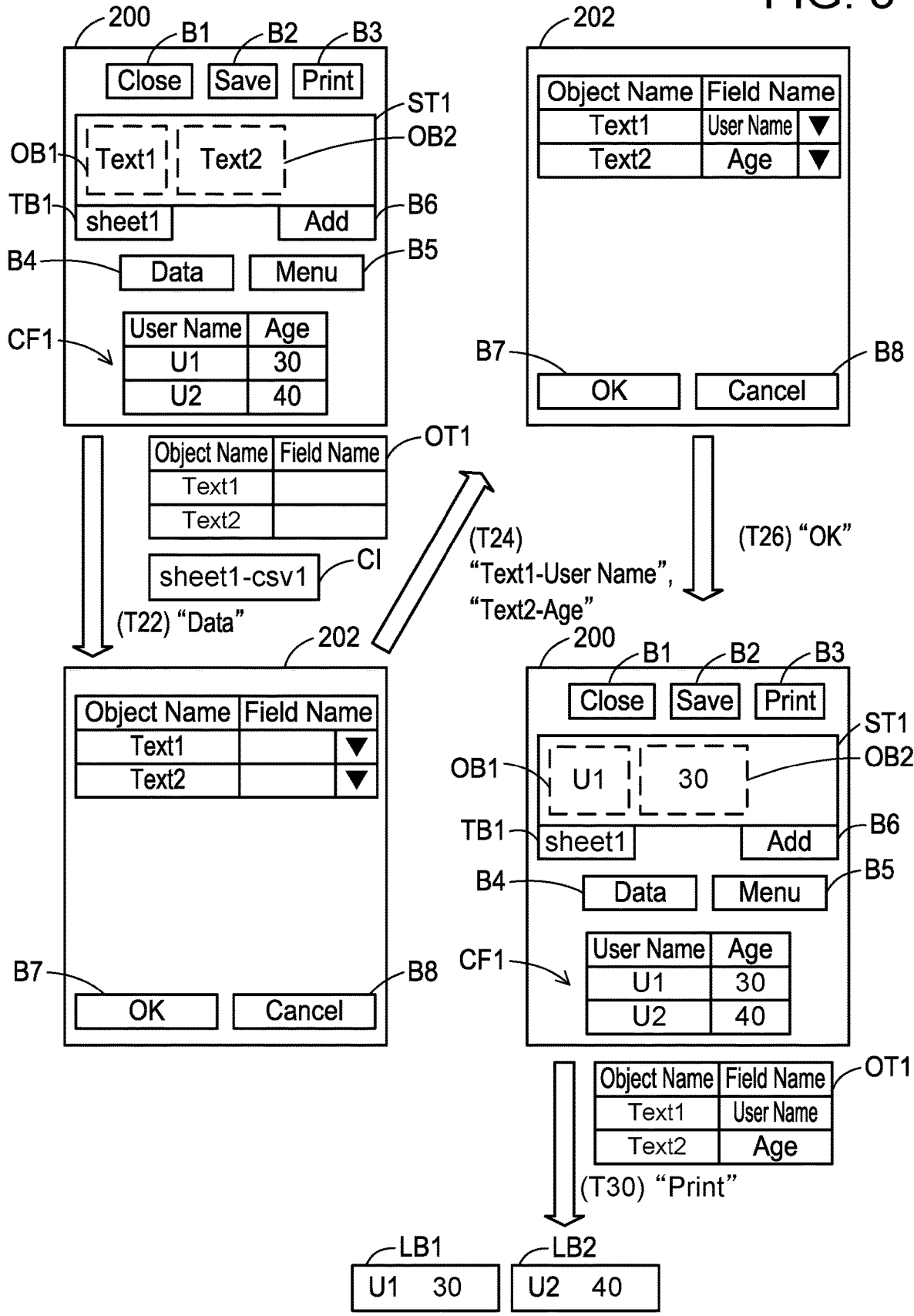
FIG. 3 illustrates a sequence diagram of continuation of FIG. 2.

(Case A; FIGS. 2, 3)

With reference to FIGS. 2, 3, Case A in which labels LB1, LB2 (see FIG. 3) are printed by using the csv file CF1 (see FIG. 1) will be described. In an initial state of Case A, the label file LF1 is stored in the memory 24. The csv information CI of the label file LF1 is in a vacant state.

The mobile terminal 10 is configured to execute the following processes in accordance with the print app 30 when the mobile terminal 10 receives an application activation operation for activating the print app 30. Firstly, upon receiving an operation for opening the label file LF1, the mobile terminal 10 displays a first top screen 200 on the display unit 12. The first top screen 200 includes a Close button B1, a Save button B2, a Print button B3, a Data button B4, a Menu button B5, an Add button B6, a first image sheet ST1, and a first sheet tab TB1. The Close button B1 is a button for finishing the print app 30. The Save button B2 is a button for saving the label file LF1. The Print button B3 is a button for executing a label printing process. The Data button B4 is a button for displaying a first object screen 202 (see FIG. 3) for associating an object area and a field name. The Menu button B5 is a button for displaying plural menus. The Add button B6 is a button for adding an image sheet. The first image sheet ST1 is an area which corresponds to a label image to be printed by the label printer 50.

The mobile terminal 10 displays a first menu screen MS1 on the first top screen 200 when receiving selection of the Menu button B5 in T10. The first menu screen MS1 includes a Newly Connect button MB1, a Disconnect button MB2, and a Create button MB3. The Newly Connect button MB1 is a button for opening a new csv file and associating the csv file and an image sheet being currently selected. The Disconnect button MB2 is a button for disassociating the csv file and the image sheet being currently selected. The Create button MB3 is a button for creating an object area. The object area is an area in which text(s) to be printed are to be disposed. In the present embodiment, one image sheet can be associated with only one csv file.

The mobile terminal 10 receives selection of the Create button MB3 in T12. Then the mobile terminal 10 displays an object area OB1 in the first image sheet ST1 of the first top screen 200 when an area in which the new object area OB1 is to be disposed has been designated and an input of an object name "Text 1" of the new object area OB1 has been received. Although the object name "Text 1" is displayed in the object area OB1 in the present embodiment, a text different from the object name may be displayed in the object area OB1. The mobile terminal 10 creates a first object table OT1 corresponding to the first image sheet ST1 and stores the object name "Text 1" in the first object table OT1. At this timing, the object name "Text 1" has no field name associated therewith in the first object table OT1.

The mobile terminal 10 receives selection of the Menu button B5 and receives selection of the Create button MB3 in T14. Then, the mobile terminal 10 displays an object area OB2 in the first image sheet ST1 of the first top screen 200 when an area in which the new object area OB2 is to be disposed has been designated and an input of the object name "Text 2" of the new object area OB2 has been received. The mobile terminal 10 stores the object name "Text 2" in the first object table OT1. At this timing, the object names "Text 1" and "Text 2" have no field name associated therewith respectively in the first object table OT1.

When the selection of the Menu button B5 is received, the selection of the Newly Connect button MB1 is received, and selection of the csv file CF1 is received in T20, the mobile terminal 10 displays the csv file CF1 in table format on the first top screen 200 of FIG. 3. Further, the mobile terminal 10 determines that a first connection instruction for associating the label file LF1 (the first image sheet ST1 in particular) and the csv file CF1 has been acquired, and stores the sheet name of the first image sheet ST1 "sheet 1" and the file name "csv1" of the csv file CF1 in association with each other in the csv information CI. Due to this, the first image sheet ST1 and the csv file CF1 are associated with each other and also the label file LF1 and the csv file CF1 are associated with each other.

When the selection of the Data button B4 is received in T22, the mobile terminal 10 displays the first object screen 202 on the display unit 12. In the first object screen 202, a field name setting box is associated with each of the object names "Text 1", "Text 2" stored in the first object table OT1. In the present case, the user can select the field names "User Name", "Age" in the csv file CF1 by operating the filed name setting boxes. The first object screen 202 further includes an OK button B7 and a Cancel button B8. When an operation of selecting the field name "User Name" as the field name to be associated with the object name "Text 1" and of selecting the field name "Age" as the field name to be associated with the object name "Text 2" is received in T24, the mobile terminal 10 displays "User Name" in the field name corresponding to the object name "Text 1", and displays "Age" in the field name corresponding to the object name "Text 2". When the selection of the OK button B7 is received in T26, the mobile terminal 10 stores "User Name" in the field name associated with the object name "Text 1" and stores "Age" in the field name associated with the object name "Text 2" in the first object table OT1. Due to this, a first object association between the object area OB1 and the field name "User Name" is stored in the memory 24, and a second object association between the object area OB2 and the field name "Age" is stored in the memory 24. Further, the mobile terminal 10 displays a text "U1" corresponding to the field name "User Name" in the object area OB1 within the first image sheet ST1, and displays the text "30" corresponding to the field name "Age" in the object area OB2 within the first image sheet ST1.

When the selection of the Print button B3 is received in T30, the mobile terminal 10 determines that the print instruction was acquired and performs label printing process. The mobile terminal 10 creates two pieces of print data corresponding to two label images by using the first image sheet ST1 and the csv file CF1 associated with the first image sheet ST1. Each of the two label images includes the text ("U1", "U2) disposed in the object area OB1 included in the first image sheet ST1, and associated with the field name "User Name" and the text ("30", "40") disposed in the object area OB2 included in the first image sheet ST1 and associated with the field name "Age". Next, the mobile terminal 10 sends the two pieces of print data to the label printer 50. When the label printer 50 receives the two pieces of print data from the mobile terminal 10, the label printer 50 performs printing of the two labels LB1, LB2 by using the two pieces of print data. In the label LB1, the texts "U1" and "30" are printed and in the label LB2 the texts "U2" and "40" are printed. Here, the user may select a part of the csv file CF1 as a range to be printed. For example, the user may select only a second row in the csv file CF1 as the range to be printed. In this case, a label LB1 including the texts "U1" and "30" written on the second row of the csv file CF1 is printed.

Figure 5:
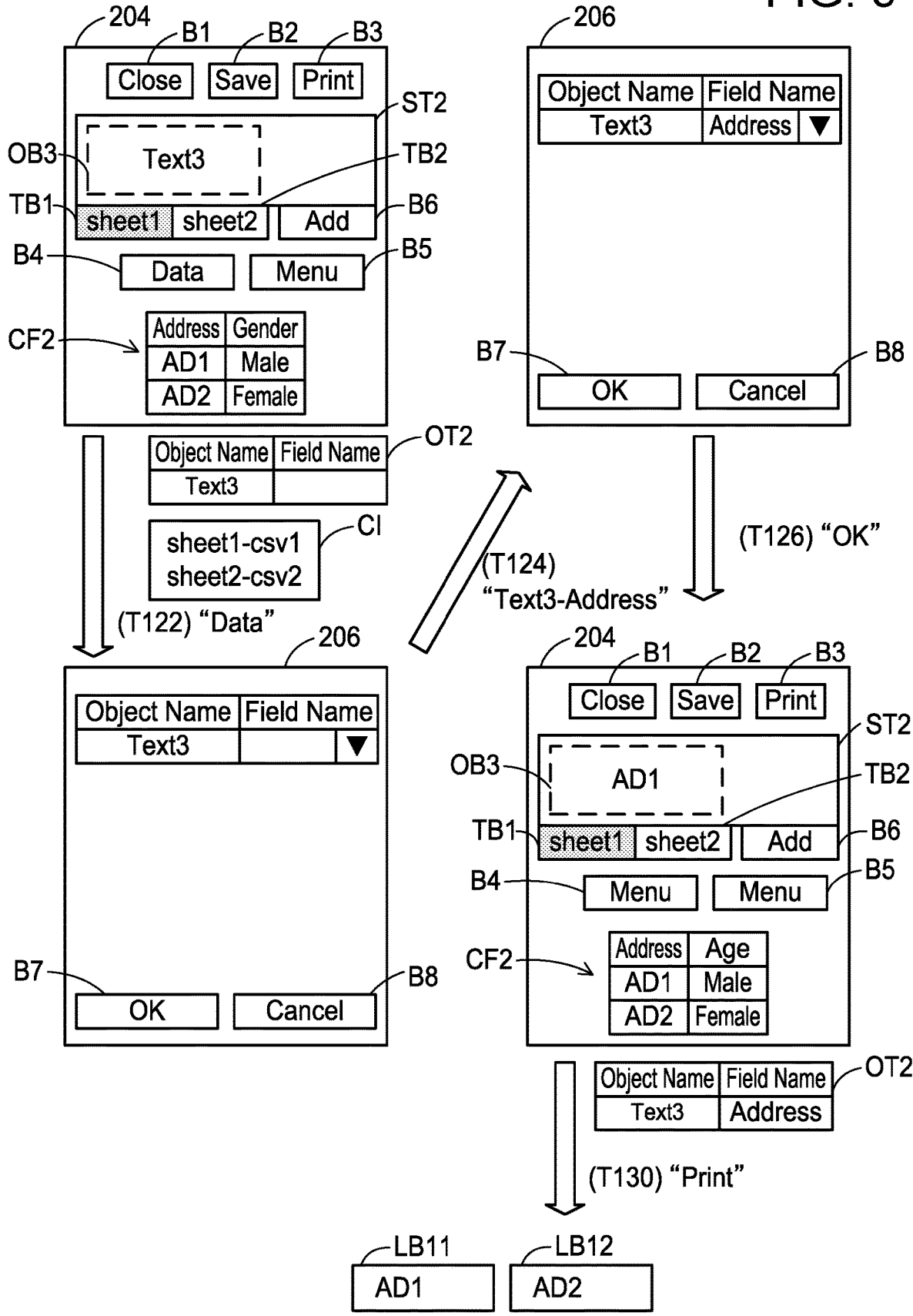
FIG. 5 illustrates a sequence diagram of continuation of FIG. 4.

(Case B; FIGS. 4, 5)

Subsequently, with reference to FIGS. 4, 5, Case B in which labels LB11, LB12 (see FIG. 5) are printed by using the csv file CF2 (see FIG. 1) will be described. An initial state of Case B is a state after Case A (see FIGS. 2, 3). That is, the sheet name "sheet 1" and the csv file name "csv1" are stored in association with each other in the csv information CI. Further, the object name "Text 1" and the field name "User Name" are stored in association with each other in the first object table OT1 and also the object name "Text 2" and the field name "Age" are stored in association with each other in the first object table OT1.

When the selection of the Add button B6 is received in T110, the mobile terminal 10 displays a second top screen 204 including a second image sheet ST2 on the display unit 12. The second top screen 204 is the same as the first top screen 200 of FIG. 3 except that the second top screen 204 includes the second image sheet ST2 and a second sheet tab TB2. Hereinbelow, an image sheet being currently selected is indicated without shading and an image sheet not being currently selected is indicated with shading. That is, in the second top screen 204, the second image sheet ST2 is selected.

When the mobile terminal 10 receives selection of the Menu button B5 in T112, the mobile terminal 10 displays a second menu screen MS2 on the second top screen 204. The second menu screen MS2 is the same as the first menu screen MS1 (see FIG. 2) except that the second menu screen MS2 includes a Connect with Existing File button MB4. The Connect with Existing File button MB4 is displayed when one or more csv file names are stored in the csv information CI, that is, when the label file LF1 is associated with one or more csv files. In the present case, since the file name "csv1" of the csv file CF1 is stored in the csv information CI, the second menu screen MS2 includes the Connect with Existing File button MB4. The user is able to, by selecting the Connect with Existing File button MB4, associate the currently selected image sheet (e.g., the second image sheet ST2) with a csv file corresponding to the file name stored in the csv information CI (e.g., the csv file CF1).

The mobile terminal 10 receives selection of the Create button MB3 in T114. Then the mobile terminal 10 displays an object area OB3 in the second image sheet ST2 of the second top screen 204 when an area in which the new object area OB3 is to be disposed has been designated and an input of an object name "Text3" of the new object area OB3 has been received. Further, the mobile terminal 10 creates a second object table OT2 corresponding to the second image sheet ST2, and stores the object name "Text3" in the second object table OT2. At this timing, the object name "Text 3" has no field name associated therewith in the second object table OT2.

When the mobile terminal 10 receives selection of the Menu button B5, the selection of the Newly Connect button MB1, and the selection of the csv file CF2 in T120, the mobile terminal 10 displays the csv file CF2 in table format on the second top screen 204 of FIG. 5. Further, the mobile terminal 10 determines that a second connection instruction for associating the label file LF1 (the second image sheet ST2 in particular) and the csv file CF2 has been acquired, and stores the sheet name "sheet2" of the second image sheet ST2 and the file name "csv2" of the csv file CF2 in association with each other in the csv information CI. Due to this, the second image sheet ST2 and the csv file CF2 are associated with each other, and the label file LF1 and the csv file CF2 are associated with each other. That is, the csv file CF1 and the csv file CF2 are associated with the label file LF1. Hereinbelow, in a situation where two or more csv files are associated with the label file LF1, these two or more csv files may collectively be referred to as "a related csv file".

When the mobile terminal 10 receives the selection of the Data button B4 in T122, the mobile terminal 10 displays a second object screen 206 on the display unit 12. In the second object screen 206, a field name setting box is associated with the object name "Text3" stored in the second object table OT2. In the present case, the user is able to select the field names "Address", "Gender" in the csv file CF2 by operating the field name setting box. When the mobile terminal 10 receives an operation of selecting the field name "Address" as a field name to be associated with the object name "Text3" in T124, the mobile terminal 10 displays "Address" in the field name corresponding to the object name "Text3". When the mobile terminal 10 receives selection of the OK button B7 in T126, the mobile terminal 10 determines that a third object connection instruction for associating the object name "Text3" and the field name "Address" has been acquired, and stores "Address" in the field name associated with the object name "Text3" in the second object table OT2. Due to this, a third object association between the object area OB3 and the field name "Address" is stored in the memory 24. Further, the mobile terminal 10 displays a text "AD1" corresponding to the field name "Address" in the object area OB3 in the second image sheet ST2.

When the mobile terminal 10 receives selection of the Print button B3 in T130, the mobile terminal 10 determines that a print instruction has been acquired, and executes the label printing process. The mobile terminal 10 creates two pieces of print data corresponding to two label images by using the second image sheet ST2 being currently selected and the csv file CF2 associated with the second image sheet ST2. Each of the two label images includes the text associated with the field name "Address" ("AD1", "AD2") disposed in the object area OB3 included in the second image sheet ST2. Subsequently, the mobile terminal 10 sends the two pieces of print data to the label printer 50. When the label printer 50 receives the two pieces of print data from the mobile terminal 10, the label printer 50 uses the two pieces of print data and performs printing of two labels LB11, LB12. In the label LB11, the text "AD1" is printed, and in the label LB12, the text "AD2" is printed. Here, the user may select a part of the csv file CF2 as a range to be printed. For example, the user may select only a second row in the csv file CF2 as the range to be printed. In this case, the label LB11 including the text "AD1" written on the second row of the csv file CF1 only is printed.

Effects of Present Embodiment

According to the above configuration, when the mobile terminal 10 receives the first connection instruction and the second connection instruction (T20 of FIG. 2, T120 of FIG. 4), the mobile terminal 10 causes the csv information CI (csv1, csv2) indicating association between the label file LF1 and the related file (the csv file CF1 and the csv file CF2) to be stored in the memory 24 of the mobile terminal 10 (T20 of FIG. 2, T120 of FIG. 4). The related csv file includes the four texts included in the csv file CF1 and the four texts included in the csv file CF2. Accordingly, the user is able to use the label file LF1 and the related csv file to cause the label printer 50 to perform printing of each label image including each text included in the csv file CF1 and the csv file CF2 (T130 of FIG. 5). Due to this, user convenience can be improved.

(Effects of Case A)

As shown in FIG. 5, the csv information CI indicates association between the first image sheet ST1 and the csv file CF1 (sheet1-csv1), as well as indicates association between the second image sheet ST2 and the csv file CF2 (sheet2-csv2). In a situation where the first image sheet ST1 has been selected, the mobile terminal 10 is able to use the object area OB1 (see FIG. 3) included in the first image sheet ST1 and the csv file CF1 (see FIG. 3) associated with the first image sheet ST1 to cause the label printer 50 to print a label image including the text in the csv file CF1. Further, in a situation where the second image sheet ST2 has been selected, the mobile terminal 10 is able to use the object area OB3 included in the second image sheet ST2 and the csv file CF2 associated with the second image sheet ST2 to cause the label printer 50 to print a label image including the text in the csv file CF2 (T130). According to such configuration, the user may switch csv files to be used for printing a label image by switching an image sheet being currently selected. Accordingly, user convenience can be improved.

(Correspondence Relationship)

The first connection instruction, the second connection instruction are an example of "first data association instruction", "second data association instruction", respectively. The csv file CF1, the csv file CF2 are an example of "first database file", "second database file", respectively. The related csv file is an example of "third database file". The csv information CI including the file name "csv1" of the csv file CF1 and the file name "csv2" of the csv file CF2 is an example of "data association information."

The first image sheet ST1, the second image sheet ST2 are an example of "first sheet", "second sheet", respectively. "User Name" in the csv file CF1 is an example of "first field name". The object area OB1 of the first image sheet ST1 is an example of "first object area". "Address" in the csv file CF2 is an example of "second field name". The object area OB3 of the second image sheet ST2 is an example of "second object area".

T20 of FIG. 2 is an example of process implemented by "acquire a first data association instruction". T120 of FIG. 4 is an example of process implemented by "acquire a second data association instruction". Processes after T20 of FIGS. 2 and T120 of FIG. 4 are an example of process implemented by "store data association information". Process after T130 of FIG. 5 is an example of process implemented by "create one or more pieces of print data" and "send the one or more pieces of print data".

Second Embodiment

A communication system 2 of a second embodiment will be described. The mobile terminal 10 according to the first embodiment is configured to associate each of the plural image sheets with one of different csv files. The mobile terminal 10 according to the present embodiment differs from the mobile terminal 10 according to the first embodiment in that the mobile terminal 10 according to the second embodiment associates each of the plural image sheets with a same csv file. In the present embodiment, the csv information CI of the mobile terminal 10 does not include the sheet name(s) of image sheet(s) but only includes the file name(s) of the csv file(s).

Figure 6:
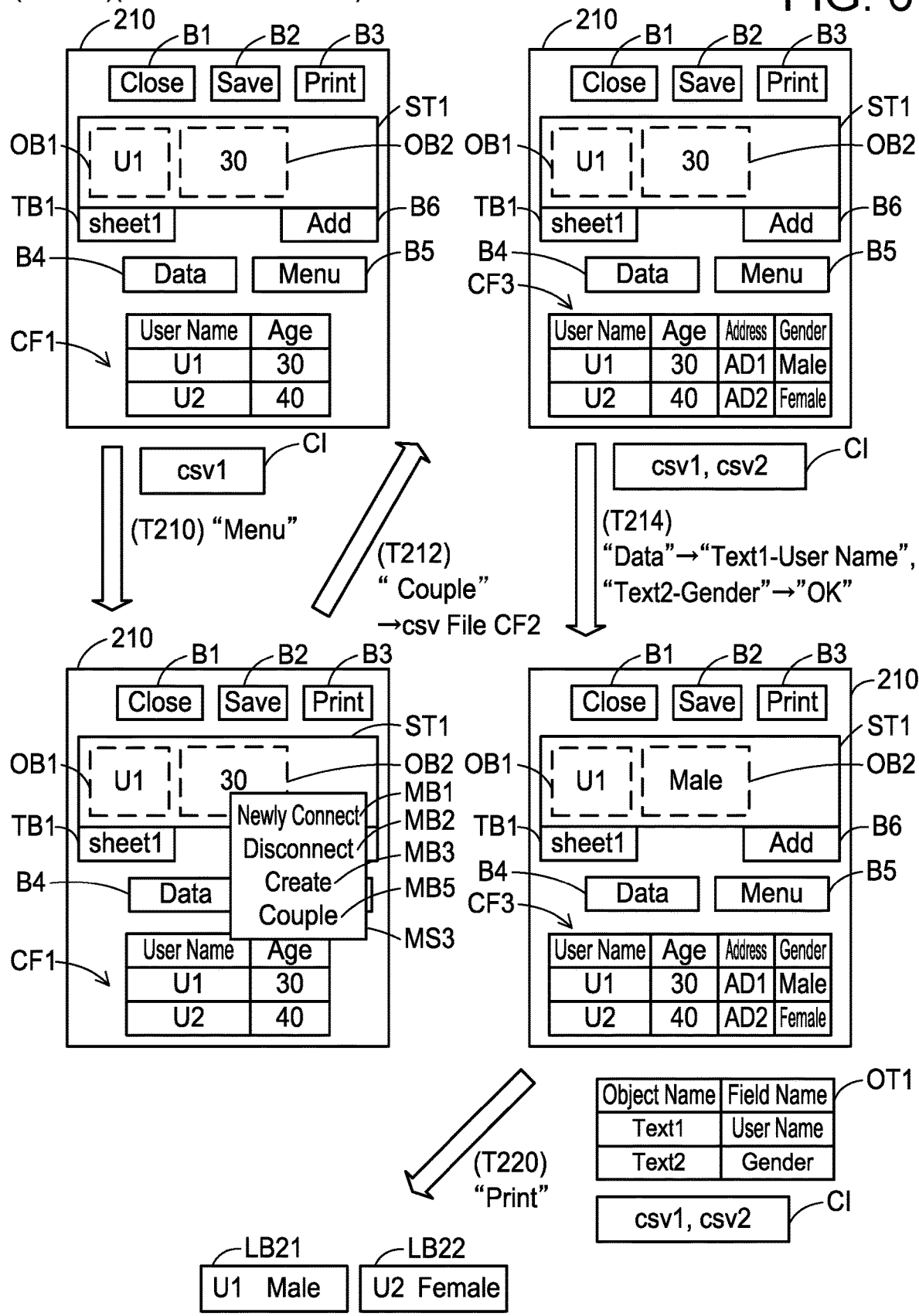
FIG. 6 illustrates a sequence diagram of Case C in which a label image indicated in the first image sheet is printed in a second embodiment.
Figure 7:
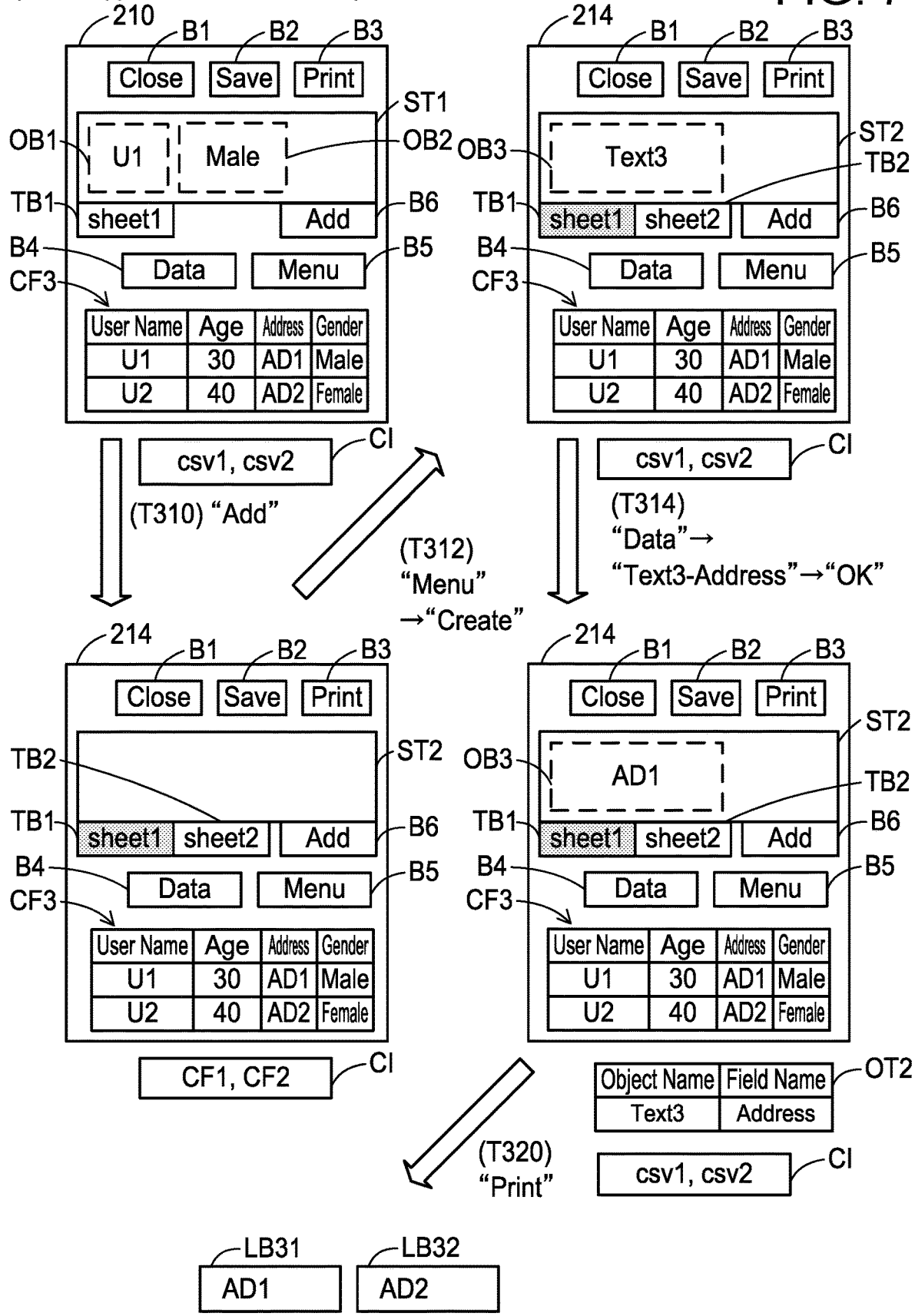
FIG. 7 illustrates a sequence diagram of Case D in which a label image indicated in a second image sheet is printed in the second embodiment.

(Specific Cases; FIG. 6, FIG. 7)

With reference to FIG. 6, FIG. 7, specific Cases C, D implemented by the communication system 2 according to the present embodiment will be described.

(Case C; FIG. 6)

With reference to FIG. 6, Case C in which the csv file CF1 and the csv file CF2 (see FIG. 1) are used to print labels LB21, LB22 will be described. An initial state of Case C is a state after Case A (see FIG. 2, FIG. 3). That is, the object name "Text1" and the field name "User Name" are stored in association with each other in the first object table OT1, and also the object name "Text2" and the field name "Age" are stored in association with each other in the first object table OT1. As mentioned above, the csv information CI of the mobile terminal 10 does not include the sheet name(s) of image sheet(s) but only includes the file name(s) of the csv file(s). Due to this, in an initial state of Case C, the csv information CI has the file name "csv1" of the csv file CF1 only stored therein. Further, a first top screen 210 is displayed on the display unit 12 of the mobile terminal 10. The first top screen 210 is the same as the first top screen 200 (see FIG. 3) in a state at the end of Case A.

When the mobile terminal 10 receives the selection of the Menu button B5 in T210, the mobile terminal 10 displays a third menu screen MS3 on the first top screen 210. The third menu screen MS3 is the same as the first menu screen MS1 (see FIG. 2) except that the third menu screen MS3 further includes a Couple button MB5. The Couple button MB5 is displayed when one or more csv files are stored in the csv information CI, that is, when the label file LF1 and one or more csv files are associated with each other. In the present case, because the file name "csv1" of the csv file CF1 is stored in the csv information CI, the third menu screen MS3 includes the Couple button MB5. The Couple button MB5 is a button for associating the label file LF1 and a new csv file with each other without disassociating the label file LF1 and the csv file currently associated with the label file LF1.

When the mobile terminal 10 receives selection of the Couple button MB5 and the selection of the csv file CF2 in T212, the mobile terminal 10 displays a virtual csv file CF3 made by virtually combining the csv file CF1 and the csv file CF2 on the first top screen 210 in table format. Further, the mobile terminal 10 determines that the third connection instruction for associating the label file LF1 and the csv file CF2 with each other has been acquired and stores the file name "csv2" of the csv file CF2 in the csv information CI. Due to this, the related csv file including the csv file CF1 and the csv file CF2 is associated with the label file LF1. Under this state, the related csv file (the csv file CF1 and the csv file CF2) is associated with the first image sheet ST1.

When the mobile terminal 10 receives the selection of the Data button B4 in T214, the mobile terminal 10 displays an object screen (not shown) on the display unit 12. In the present case, the user is able to operate the field name setting box to select "User Name", "Age" in the csv file CF1 and the field names "Address" and "Gender" in the csv file CF2. When the mobile terminal 10 further receives an operation of selecting the field name "User Name" as the field name to be associated with the object name "Text1" and selecting the field name "Gender" as the field name to be associated with the object name "Text2" and receives the selection of the OK button B7 in T214, the mobile terminal 10 stores "User Name" in the field name associated with the object name "Text1" and stores "Gender" in the field name associated with the object name "Text2" in the first object table OT1. Due to this, a first object association between the object area OB1 and the field name "User Name" is stored in the memory 24, and a fourth object association between the object area OB2 and the field name "Gender" is stored in the memory 24. Further, the mobile terminal 10 displays the text "U1" corresponding to the field name "User Name" in the object area OB1 on the first image sheet ST1, and displays the text "Male" corresponding to the field name "Gender" in the object area OB2 on the first image sheet ST1.

When the mobile terminal 10 receives the selection of the Print button B3 in T220, the mobile terminal 10 determines that the print instruction has been acquired, and performs the label printing process. The mobile terminal 10 creates two pieces of print data corresponding to two label images by using the first image sheet ST1 and the virtual csv file CF3 (the csv file CF1 and the csv file CF2 in particular). Each of the two label images includes the text ("U1", "U2") disposed in the object area OB1 included in the first image sheet ST1 and associated with the field name "User Name" and the text ("Male", "Female") disposed in the object area OB2 included in the first image sheet ST1 and associated with the field name "Gender". Subsequently, the mobile terminal 10 sends the two pieces of print data to the label printer 50. When the label printer 50 receives the two pieces of print data from the mobile terminal 10, the label printer 50 uses the two pieces of print data to perform printing of the two labels LB21, LB22. In the label LB21, the texts "U1" and "Male" are printed, and in the label LB22, the texts "U2" and "Female" are printed. Here, the user may select a part of the virtual csv file CF3 as a range to be printed.

(Case D; FIG. 7)

With reference to FIG. 7, Case D in which the csv file CF2 is used to print labels LB31, LB32 will be described. An initial state of Case D is a state after Case C (see FIG. 6). That is, the csv file name "csv1" is stored in the csv information CI. Further, the object name "Text1" and the field name "User Name" are stored in association with each other in the first object table OT1 and the object name "Text2" and the field name "Gender" are stored in association with each other in the first object table OT1 (see FIG. 6).

When the mobile terminal 10 receives the selection of the Add button B6 in T310, the mobile terminal 10 displays a second top screen 214 including the second image sheet ST2 on the display unit 12. The second top screen 214 is the same as the first top screen 210 except that the second top screen 214 includes the second image sheet ST2 and the second sheet tab TB2. In the present embodiment, because the related csv file (the csv file CF1 and the csv file CF2) is associated with the label file LF1, the related csv file (the csv file CF1 and the csv file CF2) and the second image sheet ST2 are associated with each other. T312 is the same as T112, T114 of FIG. 4. Due to this, the object area OB3 is created in the second image sheet ST2 of the second top screen 214. Further, the mobile terminal 10 creates the second object table OT2 corresponding to the second image sheet ST2.

The mobile terminal 10 receives selection of the Data button B4, receives an operation of selecting the field name "Address" as a field name to be associated with the object name "Text3", and receives selection of the OK button B7 in T314. The mobile terminal 10 stores the field name "Address" in association with the object name "Text3" in the second object table OT2. Due to this, the third object association between the object area OB3 and the field name "Address" is stored in the memory 24. Further, the mobile terminal 10 displays the text "AD1" corresponding to the field name "Address" in the object area OB3 within the second image sheet ST2.

When the mobile terminal 10 receives selection of the Print button B3 in T320, the mobile terminal 10 determines that the print instruction has been acquired, and performs the label printing process. The mobile terminal 10 creates two pieces of print data corresponding to two label images by using the second image sheet ST2 and the virtual csv file CF3 (the csv file CF1 and the csv file CF2 in particular). Each of the two label images includes the text ("AD1", "AD2") disposed in the object area OB3 included in the second image sheet ST2 and associated with the field name "Address". Next, the mobile terminal 10 sends the two pieces of print data to the label printer 50. When the label printer 50 receives the two pieces of print data from the mobile terminal 10, the label printer 50 uses the two pieces of print data to perform printing of the two labels LB31, LB32. In the label LB31, the text "AD1" is printed, and in the label LB32, the text "AD2" is printed. Here, the user may select a part of the virtual csv file CF3 as a range to be printed. For example, the user may select only a second row in the virtual csv file CF3 as the range to be printed. In this case, a label LB31 including only the text "AD1" written on the second row of the virtual csv file CF3 is printed.

(Effects of Present Embodiment)

According to the above configuration, when the mobile terminal 10 acquires the first connection instruction and the third connection instruction (T20 of FIG. 2, T212 of FIG. 6), the mobile terminal 10 causes the csv information CI (csv1, csv2) indicating association between the label file LF1 and the related csv file (the csv file CF1 and the csv file CF2) to be stored in the memory 24 of the mobile terminal 10 (T20 of FIG. 2, T212 of FIG. 6). The related csv file includes four texts included in the csv file CF1 and four texts included in the csv file CF2. Accordingly, the user is able to, by using the label file LF1 and the related csv file, cause the label printer 50 to print each label image including the respective text(s) included in the csv file CF1 and the csv file CF2 (T220 of FIG. 6, T320 of FIG. 7). Due to this, user convenience can be improved.

As shown in Case D of FIG. 7, the first image sheet ST1 has the csv file CF1 and the csv file CF2 associated therewith. Then, the mobile terminal 10 is able to cause the label printer 50 to print a label image including only the text included in one of the two csv files CF1, CF2 associated with the first image sheet ST1 (T320). According to such configuration, user convenience can be improved as compared to a configuration where the label printer 50 can be caused to print only a label image including both the text included in the csv file CF1 and the text included in the csv file CF2.

As shown in Case C of FIG. 6, the first image sheet ST1 has the csv file CF1 and the csv file CF2 associated therewith. Then, the mobile terminal 10 can cause the label printer 50 to print a label image including the text included in the csv file CF1 and the text included in the csv file CF2 (T220). According to such configuration, user convenience can be improved as compared to a case where the label printer 50 can be caused to print a label image including only the text included in the csv file CF1, or a label image including only the text included in the csv file CF2.

As shown in Case C of FIG. 6, when the mobile terminal 10 acquires the first connection instruction and the third connection instruction (T20 of FIG. 2, T212 of FIG. 6), the mobile terminal 10 displays the virtual csv file CF3 including the four texts of the csv file CF1 and the four texts of the csv file CF2 on the display unit 12. According to such configuration, the user is able to acknowledge that the related csv file including the csv file CF1 and the csv file CF2 is associated with the label file LF1. Accordingly, user convenience can be improved.

(Correspondence Relationship)

The first connection instruction and the third connection instruction are respectively an example of "first data association instruction" and "second data association instruction". The virtual csv file CF3 is an example of "database-related information".

T20 of FIG. 2 is an example of process implemented by "acquire a first data association instruction". T212 of FIG. 6 is an example of process implemented by "acquire a second data association instruction". Processes performed after T20 of FIGS. 2 and T212 of FIG. 6 are an example of process implemented by "store data association information". Process performed after T220 of FIG. 6 is an example of process implemented by "create one or more pieces of print data" and "send the one or more pieces of print data".

Third Embodiment

The communication system 2 according to a third embodiment will be described. The mobile terminal 10 according to the present embodiment differs from the mobile terminal 10 according to the first embodiment and the second embodiment in that the mobile terminal 10 according to the present embodiment has a function of causing object areas of plural image sheets to be displayed in one preview image sheet.

(Specific Cases; FIG. 8 to FIG. 11)

With reference to FIGS. 8 to 11, specific Case E, Case F implemented by the communication system 2 according to the present embodiment will be described.

Figure 9:
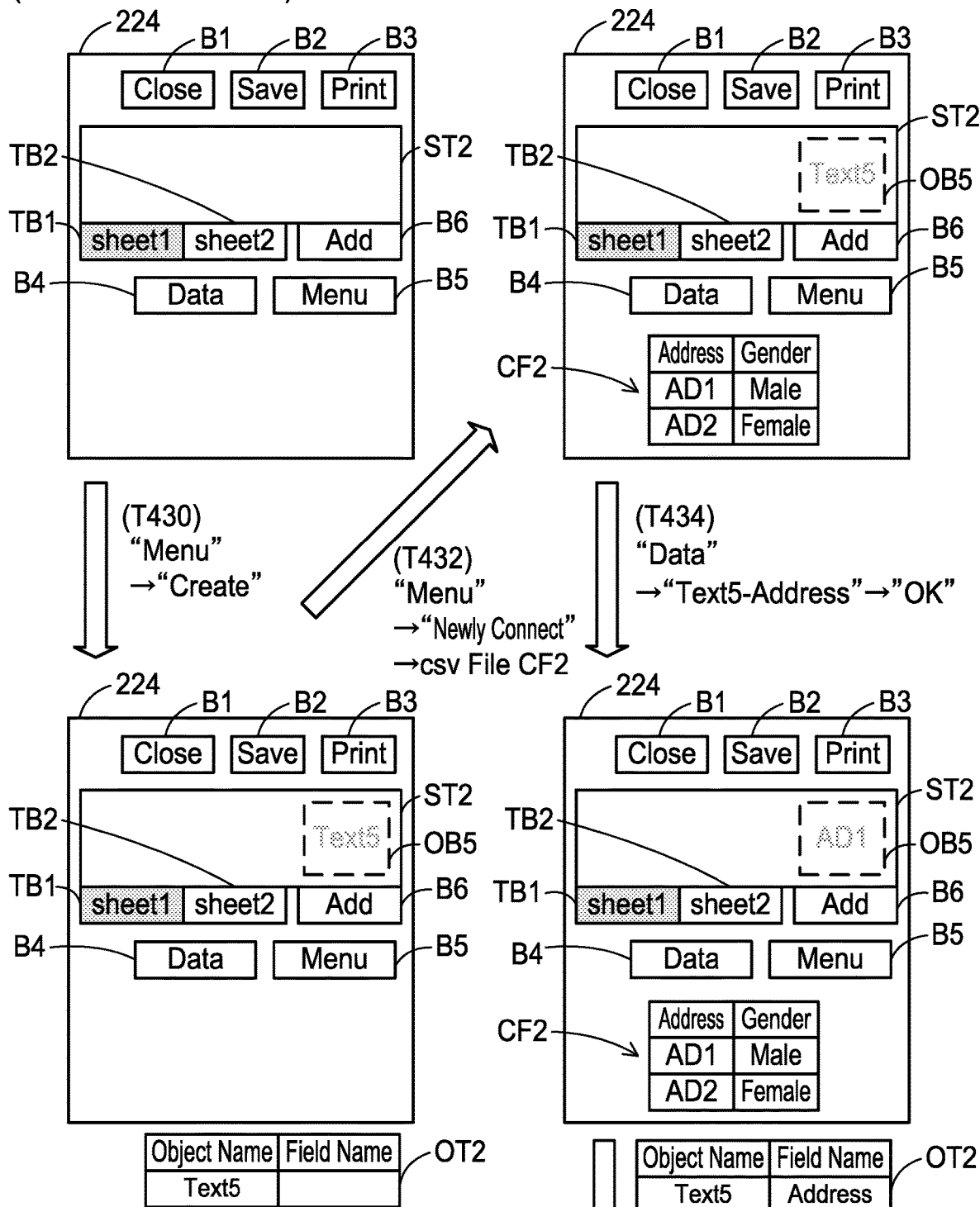
FIG. 9 illustrates a sequence diagram of continuation of FIG. 8.
Figure 10:
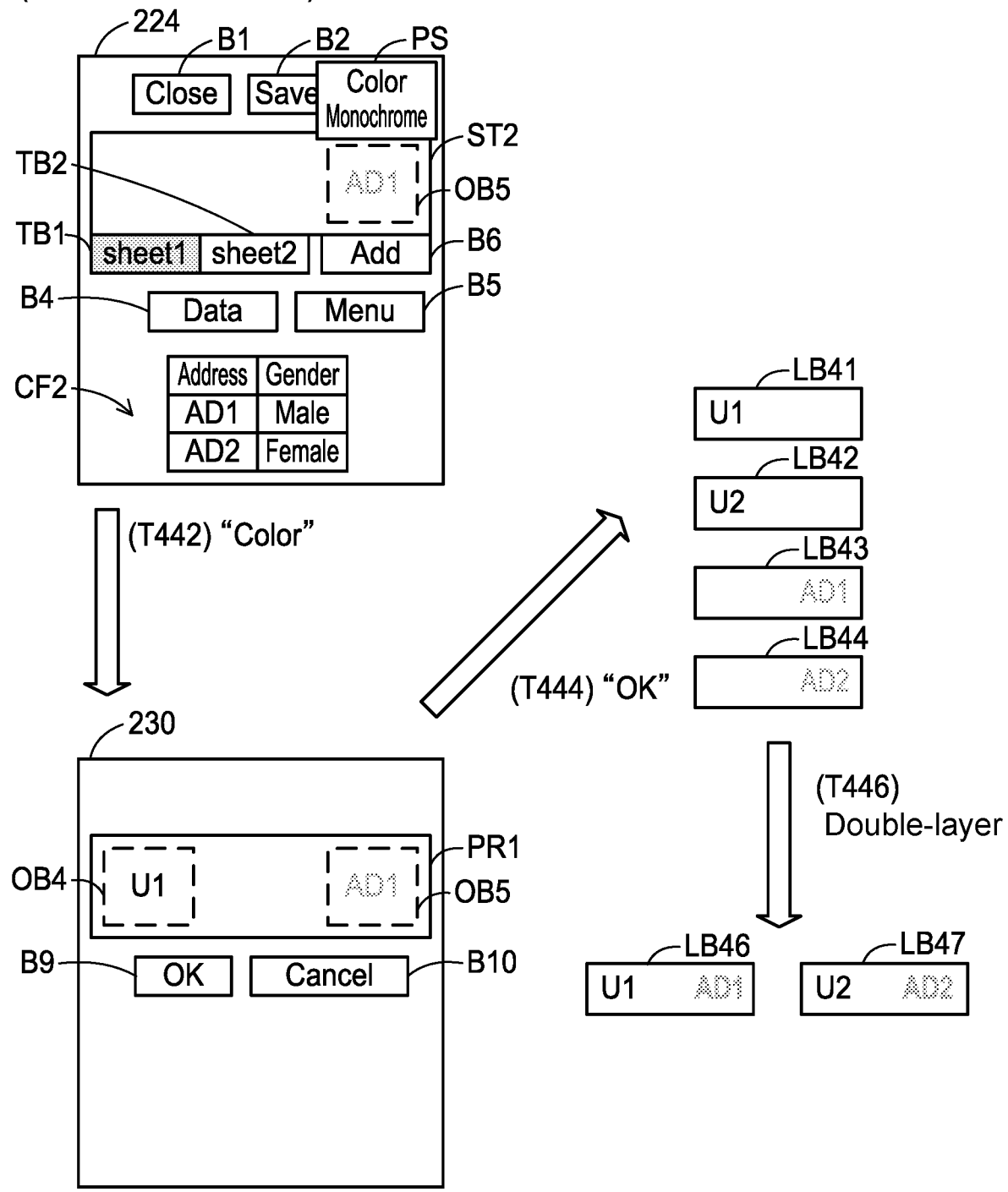
FIG. 10 illustrates a sequence diagram of FIG. 9.

(Case E; FIGS. 8 to 10)

With reference to FIGS. 8 to 10, Case E in which labels LB41 to LB44 including two texts having different colors are printed will be described. An initial state of Case E is the same as the initial state of Case A (see FIG. 2, FIG. 3). Further, a label tape for printing a text in black is mounted on the print executing unit 54 of the label printer 50. A first top screen 220 displayed in the initial state of Case E is the same as the first top screen 200 displayed in the initial state of Case A (see FIGS. 2, 3).

T410 is the same as T10 and T12 of FIG. 2. When an area where an object area OB4 is to be disposed is designated and an input of an object name "Text4" of the object area OB4 is received, the mobile terminal 10 displays the object area OB4 in the first image sheet ST1 of the first top screen 220. Further, the mobile terminal 10 creates the first object table OT1 corresponding to the first image sheet ST1 and stores the object name "Text4" in the first object table OT1. T412 is the same as T20 of FIG. 2. In this case, the csv file CF1 is displayed in table format on the first top screen 220. T414 is the same as T22, T24, and T26 of FIG. 3 except that the field name "User Name" is associated with the object name "Text4". The mobile terminal 10 stores the field name "User Name" in association with the object name "Text4" in the first object table OT1. Due to this, a fifth object association between the object area OB4 and the field name "User Name" is stored in the memory 24. Further, the mobile terminal 10 displays a text "U1" corresponding to the field name "User Name" in the object area OB4 within the first image sheet ST1.

When the mobile terminal 10 receives selection of the Add button B6 in T420, the mobile terminal 10 displays a second top screen 224 including the second image sheet ST2 on the display unit 12. T430 is the same as T112 and T114 of FIG. 4. When an area where an object area OB5 is to be disposed is designated and an input of the object name "Text5" of the object area OB5 is received, the mobile terminal 10 displays the object area OB5 in the second image sheet ST2 of the second top screen 224. In the present embodiment, a text in the object area OB5 has a color different from that of the text in the object area OB4 of the first image sheet ST1 (see FIG. 8). In the present embodiment, the text in the object area OB4 (see FIG. 8) has black color, whereas the text in the object area OB5 has gray color. Further, the mobile terminal 10 creates a second object table OT2 corresponding to the second image sheet ST2, and stores the object name "Text5" in the second object table OT2. T432 is the same as T120 of FIG. 4. In this case, the csv file CF2 is displayed in table format on the second top screen 224. T434 is the same as T122, T124, and T126 of FIG. 5 except that the field name "Address" is associated with the object name "Text5". The mobile terminal 10 stores the field name "Address" in association with the object name "Text5" in the second object table OT2. Due to this, a sixth object association between the object area OB5 and the field name "Address" is stored in the memory 24. Further, the mobile terminal 10 displays the text "AD1" corresponding to the field name "Address" in the object area OB5 within the second image sheet ST2.

When the mobile terminal 10 receives selection of the Print button B3 in T440, the mobile terminal 10 displays a print color selection screen PS of FIG. 10 on the second top screen 224. The print color selection screen PS is a screen for selecting one of color printing and monochrome printing. When the mobile terminal 10 receives selection of "Color" on the print color selection screen PS in T442, the mobile terminal 10 displays a color preview screen 230 on the display unit 12. The color preview screen 230 includes a color preview image sheet PR1, an OK button B9, and a Cancel button B10. A size of the color preview image sheet PR1 is the same as a size of the first image sheet ST1 (see FIG. 8) and a size of the second image sheet ST2. In the color preview image sheet PR1, the object area OB4 and the object area OB5 are displayed. The object area OB4 is displayed at a same spot as that of the object area OB4 in the first image sheet ST1 (see FIG. 8). The text "U1" in the object area OB4 has the same color (black in the present embodiment) as the text "U1" in the first image sheet ST1 (see FIG. 8). Further, the object area OB5 is displayed at a same spot as that of the object area OB5 in the second image sheet ST2. The text "AD1" in the object area OB5 has the same color (gray in the present embodiment) as that of the text "AD1" in the second image sheet ST2. That is, the text "U1" in the object area OB4 and the text "AD1" in the object area OB5 have different colors from each other.

When the mobile terminal 10 receives selection of the OK button B9 in T444, the mobile terminal 10 determines that a color print instruction has been acquired and performs the label printing process. Firstly, the mobile terminal 10 creates two pieces of print data corresponding to two label images by using the first image sheet ST1 and the csv file CF1. Each of the two label images includes a text ("U1", "U2") disposed in the object area OB4 included in the first image sheet ST1 and associated with the field name "User Name". Subsequently, the mobile terminal 10 sends the two pieces of print data to the label printer 50. When the label printer 50 receives the two pieces of print data from the mobile terminal 10, the label printer 50 uses the two pieces of print data and performs printing of two labels LB41, LB42. In the label LB41, the text "U1" is printed in black, whereas in the label LB42 the text "U2" is printed in black. The label LB41 and the label LB42 are printed on a label tape in white or transparent tape. Subsequently, the mobile terminal 10 displays, on the display unit 12, a message encouraging to replace the label tape mounted in the label printer 50 with a label tape for printing texts having gray color. In this case, the label tape mounted on the print executing unit 54 of the label printer 50 is replaced with the label tape for printing texts having gray color by the user. Next, the mobile terminal 10 creates two pieces of print data corresponding to two label images by using the second image sheet ST2 and the csv file CF2. Each of the two label images includes a text ("AD1", "AD2") disposed in the object area OB5 included in the second image sheet ST2 and associated with the field name "Address". Subsequently, the mobile terminal 10 sends the two pieces of print data to the label printer 50. When the label printer 50 receives the two pieces of print data from the mobile terminal 10, the label printer 50 uses the two pieces of print data and performs printing of two labels LB43, LB44. In the label LB43, the text "AD1" is printed in gray, and in the label LB44, the text "AD2" is printed in gray. The label LB43 and the label LB44 are printed on transparent label tape. Thereafter the label LB43 is applied over the label LB41 so that a double-layered label LB46 is completed, and the label LB44 is applied over the label LB42 so that a double-layered label LB47 is completed. The double-layered label LB46 includes the text "U1" having black color and the text "AD1" having the gray color, and the double-layered label LB47 includes the text "U2" having the black color and "AD2" having the gray color. Here, the user may select a part of the csv file CF2 as a range to be printed. For example, the user may select only a second row in the csv file CF2 as the range to be printed. When the second row in the csv file CF2 only is selected as the range to be printed, the mobile terminal 10 specifies the second row in the csv file CF2 and the second row in the csv file CF1 as the range to be printed. In this case, the label LB41 including the text "U1" written in the second row in the csv file CF1 and the label LB43 including the text "AD1" written in the second row in the csv file CF2 are printed. The above applies also when it is the user that selects the second row in the csv file CF1 as the range to be printed.

Figure 11:
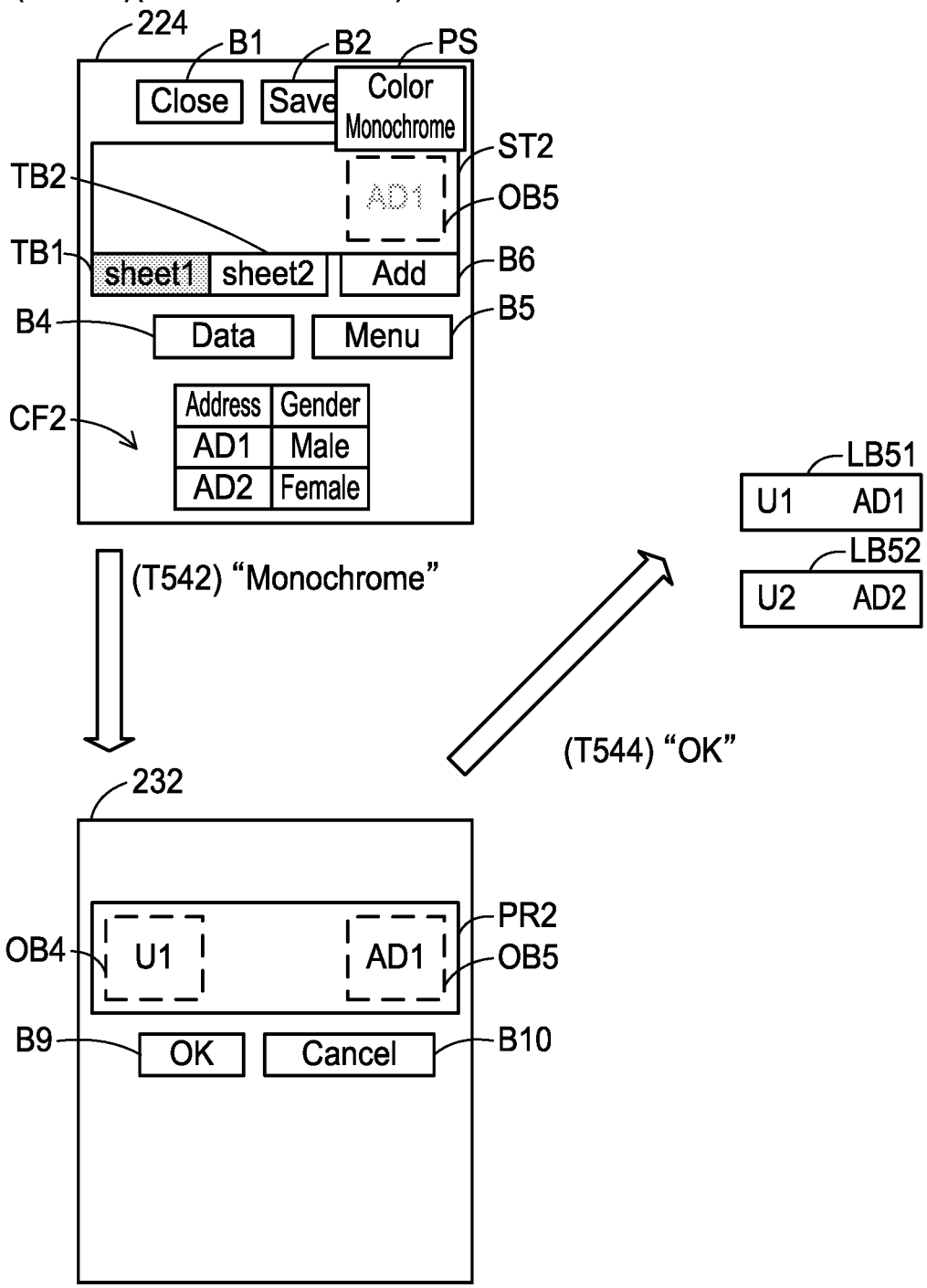
FIG. 11 illustrates a sequence of Case F in which a label image indicated in a monochrome preview image sheet is printed in the third embodiment.

(Case F; FIG. 11)

With reference to FIG. 11, Case F in which labels LB51, LB52 including two texts having a same color are printed will be described. An initial state of Case F is a state after T440 of FIG. 9 in Case E of FIGS. 8 to 10.

When the mobile terminal 10 receives selection of "Monochrome" on the print color selection screen PS in T542, the mobile terminal 10 displays a monochrome preview screen 232 on the display unit 12. The monochrome preview screen 232 includes a monochrome preview image sheet PR2, an OK button B9, and a Cancel button B10. A size of the monochrome preview image sheet PR2 is the same as the size of the first image sheet ST1 (see FIG. 8) and as the size of the second image sheet ST2. The monochrome preview image sheet PR2 includes the object area OB4 and the object area OB5. The object area OB4 is displayed at a same spot as that of the object area OB4 in the first image sheet ST1 (see FIG. 8). The text "U1" in the object area OB4 has black color. Also, the object area OB5 is displayed at a same spot as that of the object area OB5 in the second image sheet ST2. The text "AD1" in the object area OB5 has black color. That is, the text "U1" in the object area OB4 and the text "AD1" in the object area OB5 have the same color.

When the mobile terminal 10 receives the selection of the OK button B9 in T544, the mobile terminal 10 determines that a monochrome print instruction has been acquired and performs the label printing process. The mobile terminal 10 creates two pieces of print data corresponding to two label images by using the monochrome preview image sheet PR2 and the csv files CF1 and CF2. Each of the two label images includes a text ("U1", "U2") disposed in the object area OB4 included in the monochrome preview image sheet PR2 and associated with the field name "User Name" and a text ("AD1", "AD2") disposed in the object area OB5 included in the monochrome preview image sheet PR2 and associated with the field name "Address". Next, the mobile terminal 10 sends two pieces of print data to the label printer 50. When the label printer 50 receives the two pieces of print data from the mobile terminal 10, the label printer 50 uses the two pieces of print data to perform printing of the two labels LB51, LB52. In the label LB51, the texts "U1" and "AD1" are printed in black, whereas in the label LB52, the texts "U2" and "AD2" are printed in black. Here, the user may select a part of the csv file CF2 as a range to be printed. For example, the user may select only a second row in the csv file CF2 as the range to be printed. When the second row in the csv file CF2 only is selected as the range to be printed, the mobile terminal 10 specifies the second row in the csv file CF2 and the second row in the csv file CF1 as the range to be printed. In this case, the label LB51 including the text "U1" written in the second row in the csv file CF1 and the text "AD1" written in the second row in the csv file CF2 is printed. The above applies also when it is the user that selects the second row in the csv file CF1 as the range to be printed.

(Effects of Present Embodiment)

According to the above configuration, when the mobile terminal 10 acquires the first connection instruction and the second connection instruction (T412 of FIG. 8, T432 of FIG. 9), the mobile terminal 10 causes the csv information CI (csv1, csv2) indicating association between the label file LF1 and the related csv file (the csv file CF1 and the csv file CF2) to be stored in the memory 24 of the mobile terminal 10 (T412 of FIG. 8, T432 of FIG. 9). The related csv file includes the four texts included in the csv file CF1 and the four texts included in the csv file CF2. Accordingly, the user is able to cause the label printer 50 to perform printing of each label image including each text included in the csv file CF1 and the csv file CF2, by using the label file LF1 and the related csv file (T444 of FIG. 10, T544 of FIG. 11). Due to this, user convenience can be improved.

As shown in Case E of FIG. 10, when the mobile terminal 10 receives selection of "Color" on the print color selection screen PS and receives selection of the OK button B9 (T442, T444), the mobile terminal 10 creates two label images created by using the first image sheet ST1 and the csv file CF1 and two label images created by using the second image sheet ST2 and the csv file CF1 (T444). Further, as shown in Case F of FIG. 11, when the mobile terminal 10 receives the print instruction including a monochrome printing operation (T542, T544), the mobile terminal 10 creates two label images created by using the first image sheet ST1, the csv file CF1, the second image sheet ST2, and the csv file CF2 (T544). According to such configuration, the user is able to cause the label printer 50 to print a label image including the respective texts disposed in the object areas included in the plural image sheets and a label image in which the texts disposed in the plural object areas are combined. Thus, user convenience can be improved.

As shown in Case E of FIG. 10, when the mobile terminal 10 receives "Color" on the print color selection screen PS (T442), the mobile terminal 10 displays the color preview image sheet PR1 including the object area OB4 in which the text "U1" having black color is disposed and the object area OB5 in which the text "AD1" having gray color is disposed on the display unit 12. Further, as shown in Case F of FIG. 11, when the mobile terminal 10 receives selection of "Monochrome" on the print color selection screen PS (T442), the mobile terminal 10 displays the monochrome preview image sheet PR2 including the object area OB4 in which the text "U1" having black color is disposed and the object area OB5 in which the text "AD1" having black color is disposed on the display unit 12. According to such configuration, the user is able to confirm beforehand a label image which is to be printed thereafter. Thus, user convenience can be improved.

(Correspondence Relationship)

The object area OB4 of the first image sheet ST1 and the object area OB5 of the second image sheet ST2 are an example of "first object area", "second object area", respectively. The operation of selecting "Color" on the print color selection screen PS is an example of "first predetermined operation". The label image created by using the first image sheet ST1 and the csv file CF1 and the label image created by using the second image sheet ST2 and the csv file CF2 are an example of "first-type label image", "second-type label image". The operation of selecting "Monochrome" on the print color selection screen PS is an example of "second predetermined operation". The color preview image sheet PR1 and the monochrome preview image sheet PR2 are an example of "third sheet" and "fourth sheet". Black color and gray color are an example of "first color" and "second color". Black color is an example of "third color".

T412 of FIG. 8 is an example of process implemented by "acquire a first data association instruction". T432 of FIG. 9 is an example of process implemented by "acquire a second data association instruction". Processes performed after T412 of FIGS. 8 and T432 of FIG. 9 are an example of process implemented by "store data association information". Processes performed after T444 of FIGS. 10 and T544 of FIG. 11 are an example of process implemented by "create one or more pieces of print data" and "send the one or more pieces of print data".

(First Modification) "Database file" may not be limited to a csv file, but may be any file configured to display plural texts in table format. For example, it may be an Excel file. Further, an Open button may be displayed on the first menu screen MS1 instead of the Newly Connect button MB1 displayed on the first menu screen MS1 of FIG. 2.

(Second Modification) After T212 of FIG. 6 in the second embodiment, the mobile terminal 10 may create a coupled csv file obtained by coupling the csv file CF1 and the csv file CF2 and create a coupled file name of the coupled csv file, and may store the coupled file name in the csv information CI instead of the file name "csv1" of the csv file CF1 and the file name "csv2" of the csv file CF2.

(Third Modification) In the first embodiment and the third embodiment, plural csv files may be associated with one image sheet. For example, the csv file CF1 and the csv file CF2 may be associated with the first image sheet ST1, and the csv file CF1 only may be associated with the second image sheet ST2.

(Fourth Modification) In the second embodiment, under a state where the file name "csv1" and the file name "csv2" are stored in the csv information CI, only one of the csv file CF1 and the csv file CF2 may be displayed in table format on the second top screen 212. In the present Modification, the second top screen 212 may comprise a button for switching the csv file displayed on the second top screen 212. In the present Modification, the mobile terminal 10 is able to create a label image including only the text included in the csv file CF1 or a label image including only the text included in the csv file CF2.

(Fifth Modification) "First color", "second color" may not be limited to black color, gray color, respectively. For example, "first color", "second color" may be red, blue. In other words, "second color" simply needs to be different from "first color". "Third color" may be different from "first color". Further, "third color" may be the same as "second color", or may be different from "second color".

(Sixth Modification) Three or more csv files may be associated with the label file LF1.

(Seventh Modification) The user may select two or more csv files when the Newly Connect button MB1 of the first menu screen MS1, the second menu screen MS2, and the third menu screen MS3 is selected. That is, "terminal device" may acquire simultaneously "first data association instruction" and "second data association instruction". For example, when in T20 of FIG. 2 in the first embodiment, the csv file CF1 and the csv file CF2 are selected, the mobile terminal 10 stores the sheet name "sheet1" of the first image sheet ST1 and the file name "csv1" of the csv file CF1 in association with each other in the csv information CI, the mobile terminal 10 adds the second image sheet ST2 thereto, and stores the sheet name "sheet1" of the second image sheet ST2 and the file name "csv2" of the csv file CF2 in association with each other in the csv information CI. Further when in the second embodiment, the Newly Connect button MB1 of the first menu screen MS1 is selected and the csv file CF1 and the csv file CF2 are selected, the mobile terminal 10 stores the sheet name "sheet1" and the sheet name "sheet2" in the csv information CI, and displays the virtual csv file CF3 (see FIG. 6) in table format.

(Eighth Modification) In the third embodiment, the csv information CI may not include a sheet name of an image sheet, but may include only file name(s) of csv file(s). That is, two or more csv files may be associated with the label file LF1.

(Ninth Modification) The second top screen 224 of the third embodiment (see FIG. 9) may comprise a color printing image tab and a monochrome printing image tab. In the present Modification, when the color printing image tab is selected by the user, a color printing image screen including an image sheet corresponding to the color preview image sheet PR1 (see FIG. 10) is displayed, and when the monochrome printing image tab is selected by the user, a monochrome printing image screen including an image sheet corresponding to the monochrome preview image sheet PR2 (see FIG. 11) is displayed. According to such configuration, the user is able to easily acknowledge, by selecting the color printing image tab or the monochrome printing image tab, a label image including the object area OB4 and the object area OB5.

(Tenth Modification) Although in each of the above embodiments, the respective processes of FIGS. 2 to 11 are implemented by software (that is, print app 30), at least one of these processes may be implemented by hardware such as a logic circuit.

(Reference Example) In the third embodiment, one csv file only may be associated with the label file LF1. That is, this single csv file may be associated with all the image sheets.

What is claimed is:

1. A non-transitory computer-readable recording medium storing computer-readable instructions for a terminal device, wherein the terminal device comprises:
a processor; and
a memory,
wherein the computer-readable instructions, when executed by the processor, cause the terminal device to:
acquire a first data association instruction for associating a label file and a first database file, the label file being a template for creating print data representing a label image, and the first database file including M1 texts, M1 being an integer of 1 or more;
acquire a second data association instruction for associating the label file and a second database file different from the first database file, the second database file including M2 texts, M2 being an integer of 1 or more;
in a case where the first data association instruction and the second data association instruction are acquired, store data association information which indicates an association between the label file and a third database file in the memory, the third database file including the M1 texts included in the first database file and the M2 texts included in the second database file;
in a case where a print instruction for instructing printing using the label file is acquired under a state where the data association information is stored in the memory, create one or more pieces of print data corresponding to one or more label images using the label file and the third database file associated with the label file, each of the one or more label images including one or more texts among the M1 and the M2 texts included in the third database file; and
send the one or more pieces of print data to a label printer.

2. The non-transitory computer-readable recording medium as in claim 1, wherein
the third database file includes the first database file and the second database file,
in the first database file, each of the M1 texts is associated with any one of one or more field names included in the first database file,
in the second database file, each of the M2 texts is associated with any one of one or more field names included in the second database file,
the label file includes a first sheet including one or more object areas and a second sheet including one or more object areas,
the data association information indicates an association between the first sheet included in the label file and the first database file and an association between the second sheet included in the label file and the second database file,
in a case where the printing instruction is acquired under a state where the first sheet is selected and a first field name among the one or more field names included in the first database file and a first object area among the one or more object areas included in the first sheet are associated with each other, each of the one or more label images includes a first text disposed in the first object area included in the first sheet, the first text being one of the M1 texts which is associated with the first field name, and
in a case where the printing instruction is acquired under a state where the second sheet is selected and a second field name among the one or more field names included in the second database file and a second object area among the one or more object areas included in the second sheet are associated with each other, each of the one or more label images includes a second text disposed in the second object area included in the second sheet, the second text being one of the M2 texts which is associated with the second field name.

3. The non-transitory computer-readable recording medium as in claim 1, wherein
the third database file includes the first database file and the second database file,
the label file includes a first sheet, and
the data association information indicates an association between the first sheet included in the label file and the first and second database files.

4. The non-transitory computer-readable recording medium as in claim 3, wherein
the first sheet includes one or more object areas,
in the first database file, each of the M1 texts is associated with any one of one or more field names included in the first database file,
in the second database file, each of the M2 texts is associated with any one of one or more field names included in the second database file,
in a case where the printing instruction is acquired under a state where a first field name among the one or more field names included in the first database file and a first object area among the one or more object areas included in the first sheet are associated with each other, each of the one or more label images includes a first text disposed in the first object area included in the first sheet, the first text being one of the M1 texts which is associated with the first field name, and
in a case where the printing instruction is acquired under a state where a second field name among the one or more field names included in the second database file and the first object area are associated with each other, each of the one or more label images includes a second text disposed in the first object area included in the first sheet, the second text being one of the M2 texts which is associated with the second field name.

5. The non-transitory computer-readable recording medium as in claim 4, wherein
in a case where the printing instruction is acquired under a state where the first field name and the first object area are associated with each other and the second field name and a second object area different from the first object area among the one or more object areas included in the first sheet are associated with each other, each of the one or more label images includes a first text disposed in the first object area included in the first sheet and a second text disposed in the second object area included in the first sheet, the first text being one of the M1 texts which is associated with the first field name, and the second text being one of the M2 texts which is associated with the second field name.

6. The non-transitory computer-readable recording medium as in claim 3, wherein
the terminal device further comprises a display unit;
wherein the computer-readable instructions, when executed by the processor, further cause the terminal device to:
in the case where the first data association instruction and the second data association instruction are acquired, display, on the display unit, the first sheet and database-related information which is related to the third database file associated with the first sheet, the database-related information including one or more texts among the M1 texts and one or more texts among the M2 texts.

7. The non-transitory computer-readable recording medium as in claim 1, wherein the third database file includes the first database file and the second database file,
in the first database file, each of the M1 texts is associated with any one of one or more field names included in the first database file,
in the second database file, each of the M2 texts is associated with any one of one or more field names included in the second database file,
the label file includes a first sheet including one or more object areas and a second sheet including one or more object areas,
the data association information indicates an association between the first sheet included in the label file and the first database file and an association between the second sheet included in the label file and the second database file,
in a case where the printing instruction comprising a first predetermined operation is acquired under a state where a first field name among the one or more field names included in the first database file and a first object area among the one or more object areas included in the first sheet are associated with each other and a second field name among the one or more field names included in the second database file and a second object area among the one or more object areas included in the second sheet are associated with each other, the one or more label images include one or more first-type label images and one or more second-type label images,
each of the one or more first-type label images includes a first text disposed in the first object area included in the first sheet, the first text being one of the M1 texts which is associated with the first field name,
each of the one or more second-type label images includes a second text disposed in the second object area included in the second sheet, the second text being one of the M2 texts which is associated with the second field name, and
in a case where the printing instruction comprising a second predetermined operation different from the first predetermined operation is acquired under a state where the first field name and the first object area are associated with each other and the second field name and the second object area are associated with each other, each of the one or more label images includes a third text disposed in the first object area and a fourth text disposed in the second object area, the third text being one of the M1 texts which is associated with the first field name, and the fourth text being one of the M2 texts which is associated with the second field name.

8. The non-transitory computer-readable recording medium as in claim 7, wherein
the terminal device further comprises a display unit;
wherein the computer-readable instructions, when executed by the processor, further cause the terminal device to:
in a case where the first predetermined operation is accepted, display, on the display unit, a third sheet including the first object area and the second object area, wherein the first text being one of the M1 texts which is associated with the first field name is disposed in the first object area and has a first color, and the second text being one of the M2 texts which is associated with the second field name is disposed in the second object area and has a second color different from the first color; and in a case where the second predetermined operation is accepted, display, on the display unit, a fourth sheet including the first object area and the second object area, wherein the third text being one of the M1 texts which is associated with the first field name is disposed in the first object area and has a third color, and the fourth text being one of the M2 texts which is associated with the second field name is disposed in the second object area and has the third color.

9. A terminal device comprising:
a controller; and
a memory,
wherein the controller is configured to:
acquire a first data association instruction for associating a label file and a first database file, the label file being a template for creating print data representing a label image, the first database file including M1 texts, M1 being an integer of 1 or more;
acquire a second data association instruction for associating the label file and a second database file different from the first database file, the second database file including M2 texts, M2 being an integer of 1 or more;
in a case where the first data association instruction and the second data association instruction are acquired, store data association information which indicates an association between the label file and a third database file in the memory, the third database file including the M1 texts included in the first database file and the M2 texts included in the second database file;
in a case where a print instruction for instructing printing using the label file is acquired under a state where the data association information is stored in the memory, create one or more pieces of print data corresponding to one or more label images using the label file and the third database file associated with the label file, each of the one or more label images including one or more texts among the M1 and the M2 texts that are included in the third database file; and
send the one or more pieces of print data to a label printer.

10. A method executed by a terminal device, the method comprising:
acquiring a first data association instruction for associating a label file and a first database file, the label file being a template for creating print data representing a label image, and the first database file including M1 texts, M1 being an integer of 1 or more;
acquiring a second data association instruction for associating the label file and a second database file different from the first database file, the second database file including M2 texts, M2 being an integer of 1 or more;
in a case where the first data association instruction and the second data association instruction are acquired, storing data association information which indicates an association between the label file and a third database file in a memory of the terminal device, the third database file including the M1 texts included in the first database file and the M2 texts included in the second database file;
in a case where a print instruction for instructing printing using the label file is acquired under a state where the data association information is stored in the memory, creating one or more pieces of print data corresponding to one or more label images using the label file and the third database file associated with the label file, each of the one or more label images including one or more texts among the M1 and the M2 texts that are included in the third database file; and
sending the one or more pieces of print data to a label printer.

* * * * *